(12) United States Patent
Yoshioka

(10) Patent No.: US 7,884,802 B2
(45) Date of Patent: Feb. 8, 2011

(54) INFORMATION SELECTING APPARATUS AND STORAGE MEDIUM STORING INFORMATION SELECTING PROGRAM

(75) Inventor: Yasuhiro Yoshioka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 918 days.

(21) Appl. No.: 11/802,330

(22) Filed: May 22, 2007

(65) Prior Publication Data
US 2008/0222318 A1 Sep. 11, 2008

(30) Foreign Application Priority Data
Mar. 8, 2007 (JP) .............................. 2007-058095

(51) Int. Cl.
G09G 5/00 (2006.01)
(52) U.S. Cl. ........................ 345/169; 345/156; 345/161
(58) Field of Classification Search .......... 345/156–171
See application file for complete search history.

(56) References Cited

U.S. PATENT DOCUMENTS

| 5,890,906 | A  | * | 4/1999  | Macri et al. ................. 434/247 |
| 6,297,802 | B1 | * | 10/2001 | Fujioka ....................... 345/156 |
| 7,567,701 | B2 | * | 7/2009  | Fontius ....................... 382/154 |
| 7,623,115 | B2 | * | 11/2009 | Marks ......................... 345/156 |
| 7,627,139 | B2 | * | 12/2009 | Marks et al. ................ 382/103 |
| 2006/0050052 | A1 | * | 3/2006  | Mekenkamp et al. ....... 345/156 |
| 2006/0284852 | A1 | * | 12/2006 | Hofmeister et al. ........ 345/173 |
| 2007/0171210 | A1 | * | 7/2007  | Chaudhri et al. ............ 345/173 |
| 2007/0290993 | A1 | * | 12/2007 | Baudisch et al. ........... 345/157 |
| 2008/0074391 | A1 | * | 3/2008  | Coe ............................ 345/163 |
| 2008/0174552 | A1 | * | 7/2008  | Bang .......................... 345/161 |
| 2009/0219303 | A1 | * | 9/2009  | Thelen et al. ............... 345/672 |

FOREIGN PATENT DOCUMENTS

JP 2000-10716 1/2000

* cited by examiner

Primary Examiner—Nitin Patel
(74) Attorney, Agent, or Firm—Nixon & Vanderhye, P.C.

(57) ABSTRACT

An information selecting apparatus includes a computer, and makes a user select an arbitrary item from a plurality of items by a direction input of the user. Each of the items is assigned to a direction based on an input frequency, for example. In a case that a direction input is performed by means of a polygonal guide, the items are assigned to directions corresponding to the vertexes of the guide and directions corresponding to the parts except for the vertexes. For example, a high-frequency item is assigned to the direction corresponding to the vertex, or a range of the direction assigned to the high-frequency item is relatively made larger. Furthermore, when a direction corresponding to the vertex is input, items assigned to the parts except for the vertexes may temporarily be assigned to other vertexes. In addition, when predetermined operation data is input, the items of the directions corresponding to the vertexes and the items of the directions corresponding to the parts except for the vertexes may be interchanged.

17 Claims, 28 Drawing Sheets

FIG. 3
(A)
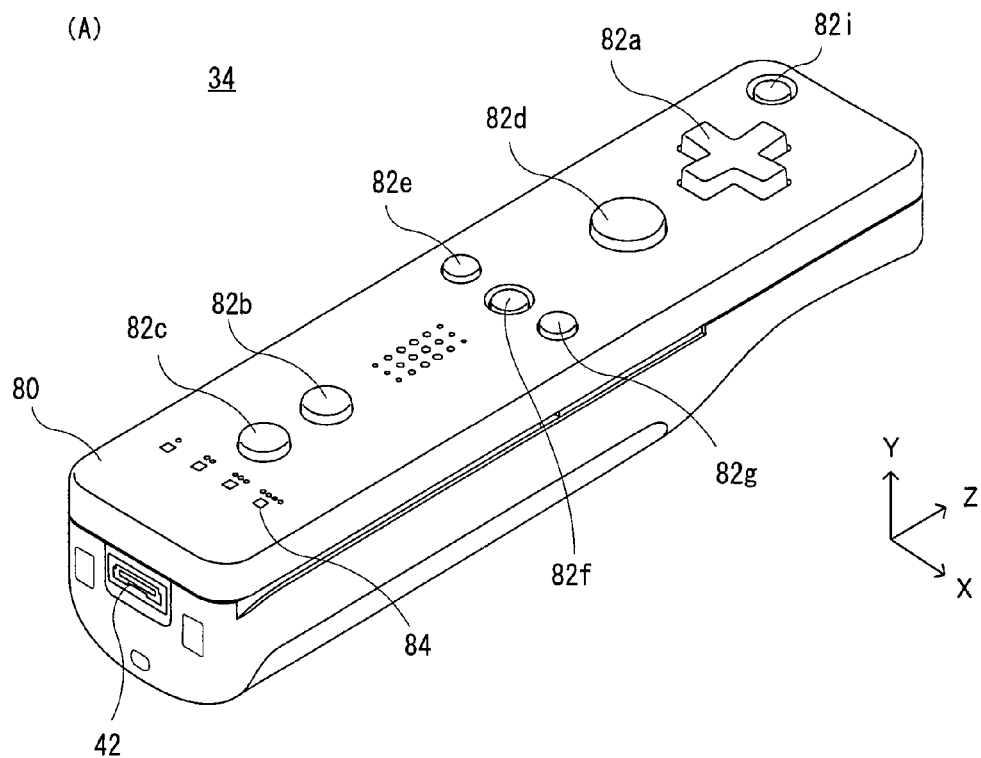
(B)
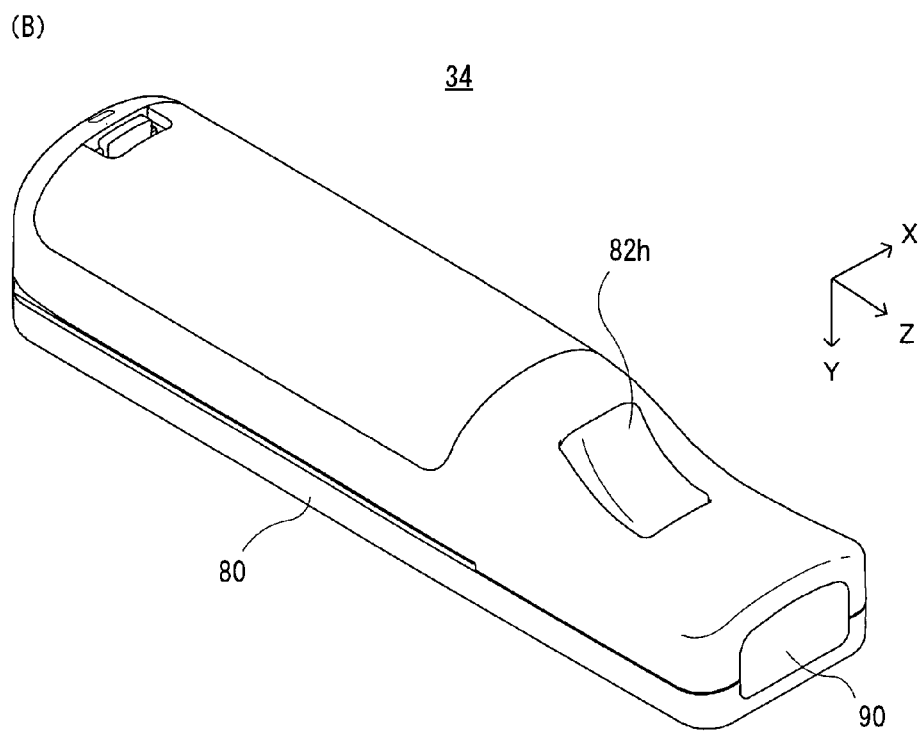

FIG. 4
(A)
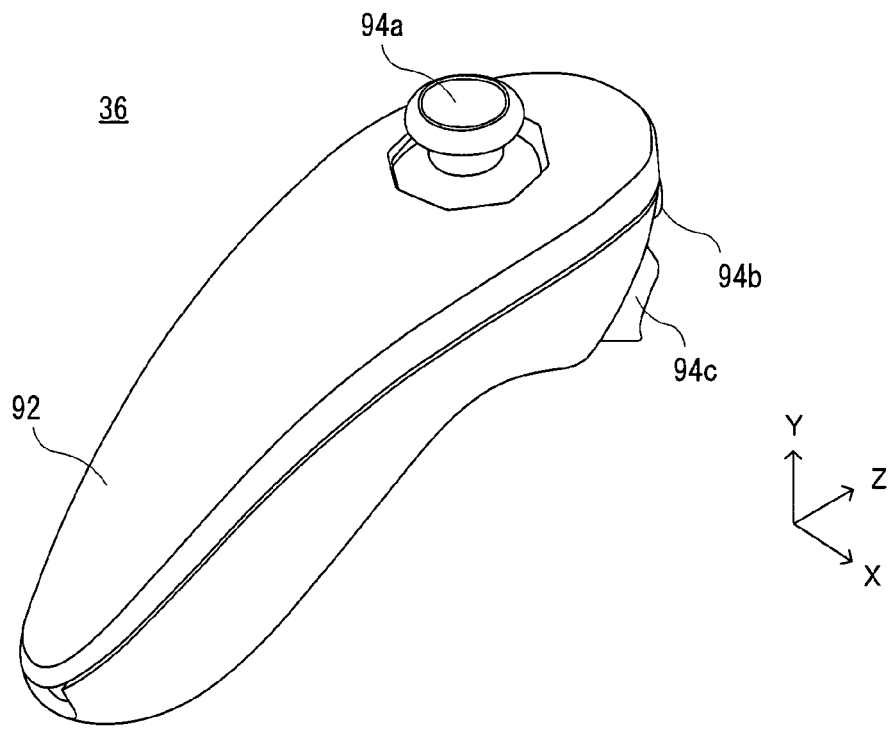
(B)
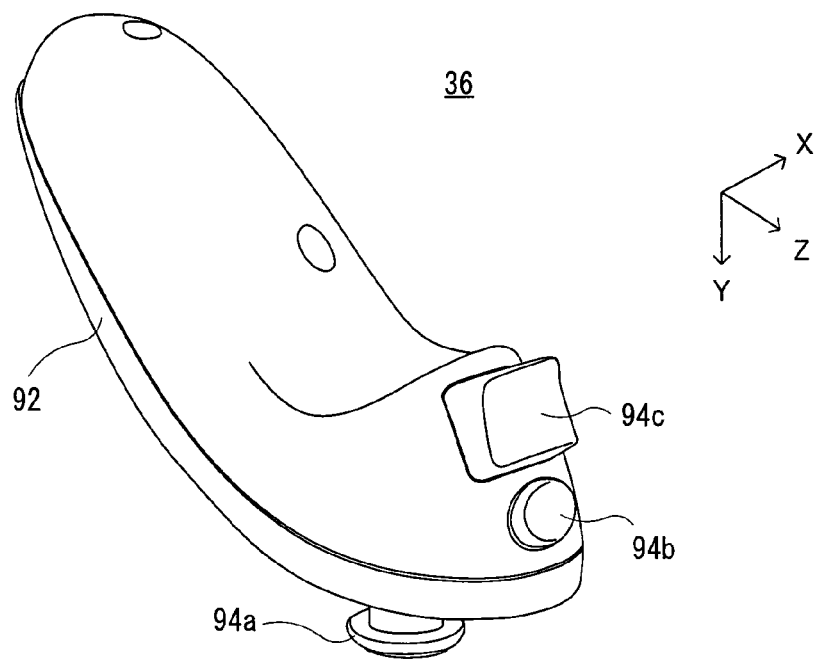

FIG. 13

ITEM DATA i[1]                                            i[32]

| abcdefghijklmnopqrstuvwxyz | i[33]                                          i[64]

| !"#$%' ()*+,-./: ;0.1.2.3.4.5.6789 | i[65]                                          i[96]

| []. []. [][][][][][][][][][][][][]. []. [] |

CHARACTER STRING DATA i[65]= " .jp"
i[67]= " .co.jp"
i[69]= " .or.jp"
i[70]= " .ne.jp"
i[71]= " .go.jp"
i[72]= " .ac.jp"
i[73]= " .gr.jp"
i[74]= " .us"
i[75]= " .com"
i[76]= " .org"
i[77]= " .net"
i[78]= " .gov"
i[79]= " .edu"
i[80]= " .mil"
i[81]= " 255."
i[83]= " 172.16."
i[85]= " 192.168."

SELECTION ITEM LIST DATA

| CELL ID | c1 | c2 | ... | c16 |
|---|---|---|---|---|
| ITEM (CHARACTER) ID | i1 | i2 | ... | i16 |

INPUT DIFFICULTY LEVEL DATA

| CELL ID | c1 | c2 | c3 | c4 | c5 | c6 | c7 | c8 | c9 | c10 | c11 | c12 | c13 | c14 | c15 | c16 |
|---|---|---|---|---|---|---|---|---|---|---|---|---|---|---|---|---|
| INPUT DIFFICULTY LEVEL di | 1 | 3 | 2 | 3 | 1 | 3 | 2 | 3 | 1 | 3 | 2 | 3 | 1 | 3 | 2 | 3 |

FIG. 17
INPUT FREQUENCY DATA
| ITEM (CHARACTER) ID | i1 | i2 | ... | in |
|---|---|---|---|---|
| INPUT FREQUENCY fi | f1 | f2 | ... | fn |
FIG. 18
(A)
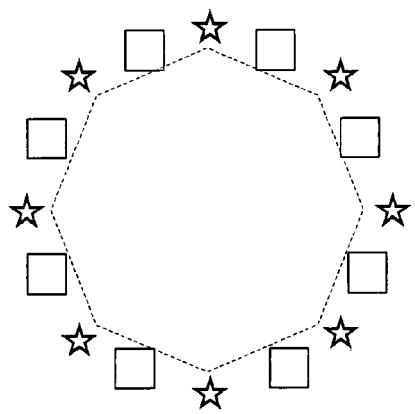
☆ : ARRANGEMENT OF HIGH-FREQUENCY ITEMS
(B)
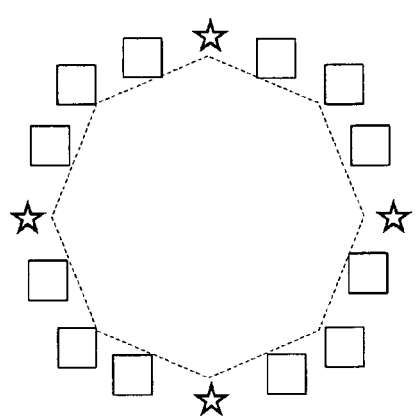
☆ : ARRANGEMENT OF HIGH-FREQUENCY ITEMS

△ : ARRANGEMENT OF ITEMS HAVING GREAT AMOUNTS OF INFORMATION ON OUTPUT

FIG. 21

ACCEPTABLE ANGLE ASSIGNING METHOD ON THE BASIS OF INPUT DIFFICULTY LEVEL AND INPUT FREQUENCY

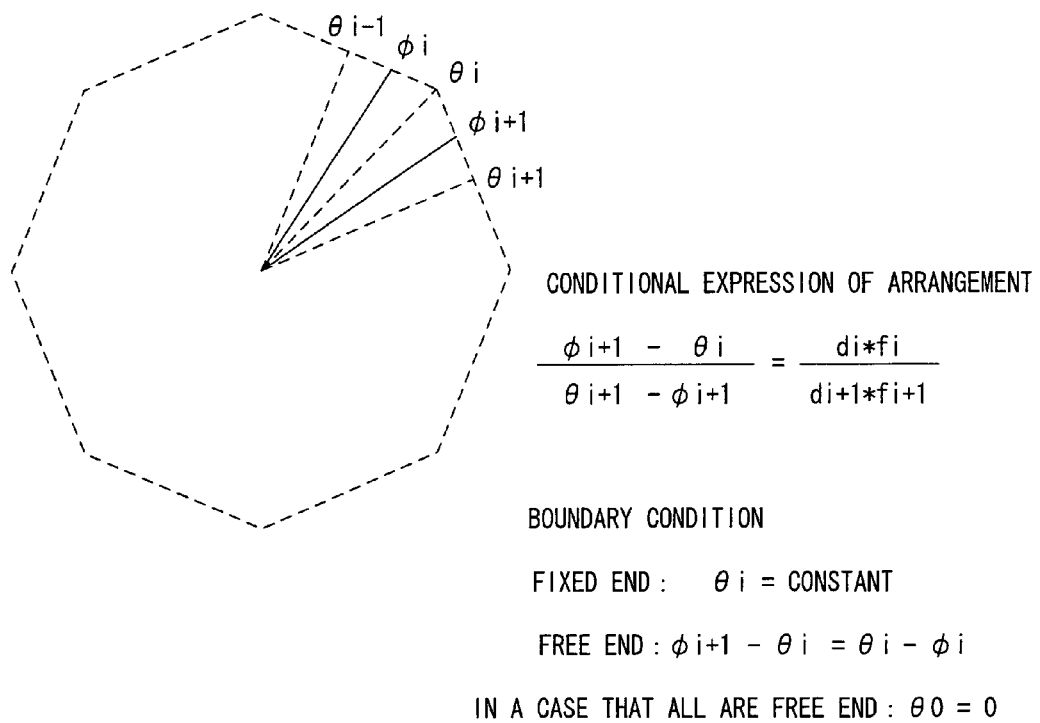

CONDITIONAL EXPRESSION OF ARRANGEMENT $$\frac{\phi_{i+1} - \theta_i}{\theta_{i+1} - \phi_{i+1}} = \frac{d_i * f_i}{d_{i+1} * f_{i+1}}$$

BOUNDARY CONDITION

FIXED END : $\theta_i$ = CONSTANT

FREE END : $\phi_{i+1} - \theta_i = \theta_i - \phi_i$

IN A CASE THAT ALL ARE FREE END : $\theta_0 = 0$

FIG. 22

CELL ANGLE DATA

| CELL ID | c1 | c2 | ... | c16 |
|---|---|---|---|---|
| ACCEPTABLE ANGLE | $\phi_1 - \phi_2$ | $\phi_2 - \phi_3$ | ... | $\phi_{16} - \phi_1$ |

| CELL ID | c1 | c2 | c3 | c4 | c5 | c6 | c7 | c8 | c9 | c10 | c11 | c12 | c13 | c14 | c15 | c16 |
|---|---|---|---|---|---|---|---|---|---|---|---|---|---|---|---|---|
| INPUT DIFFICULTY LEVEL | 1 | 3 | 2 | 3 | 1 | 3 | 2 | 3 | 1 | 3 | 2 | 3 | 1 | 3 | 2 | 3 |
| INITIAL ARRANGEMENT | 0 | . | 1 | . | 2 | . | 3 | . | 4 | . | 5 | . | 6 | 7 | 8 | 9 |
| INPUT | | | | | | | | | | | | | | A | | |
| CLOCKWISE SEARCH | | | | | | | | | | | | | | | B | |
| REARRANGEMENT OF ITEM HAVING NO CONSTRAINT | | | | | | | | | | | | | | . | | |
| REARRANGEMENT OF X | | | | | | | | | | | | | | | 7 | |
| REARRANGEMENT OF ITEM HAVING CONSTRAINT | 9 | 0 | | | | | | | | | | | | | | 8 |
| REARRANGEMENT OF THE REST OF ITEMS | | | 1 | . | 2 | . | 3 | . | 4 | . | 5 | . | 6 | | | |
| NEW ARRANGEMENT | 9 | 0 | 1 | . | 2 | . | 3 | . | 4 | . | 5 | . | 6 | . | 7 | 8 |

IS EVALUATION FUNCTION $\Sigma\ di*fi$ MINIMUM?

| CELL ID | c1 | c2 | c3 | c4 | c5 | c6 | c7 | c8 | c9 | c10 | c11 | c12 | c13 | c14 | c15 | c16 |
|---|---|---|---|---|---|---|---|---|---|---|---|---|---|---|---|---|
| INPUT DIFFICULTY LEVEL | 1 | 3 | 2 | 3 | 1 | 3 | 2 | 3 | 1 | 3 | 2 | 3 | 1 | 3 | 2 | 3 |
| INITIAL ARRANGEMENT | 0 | . | 1 | . | 2 | . | 3 | . | 4 | . | 5 | . | 6 | 7 | 8 | 9 |
| INPUT | | | | | | | | | | | | | | A | | |
| COUNTERCLOCKWISE SEARCH | | | | | | | | | | | | | B | | | |
| REARRANGEMENT OF ITEM HAVING NO CONSTRAINT | | | | | | | | | | | | | | . | | |
| REARRANGEMENT OF X | | | | | | | | | | | | | | 7 | | |
| REARRANGEMENT OF ITEM HAVING CONSTRAINT | | | | | | | | | | | | | 6 | | | |
| REARRANGEMENT OF THE REST OF ITEMS | 0 | . | 1 | . | 2 | . | 3 | . | 4 | . | 5 | | | | 8 | 9 |
| NEW ARRANGEMENT | 0 | . | 1 | . | 2 | . | 3 | . | 4 | . | 5 | 6 | 7 | . | 8 | 9 |

IS EVALUATION FUNCTION Σ di*fi MINIMUM?

| CELL ID | c1 | c2 | c3 | c4 | c5 | c6 | c7 | c8 | c9 | c10 | c11 | c12 | c13 | c14 | c15 | c16 |
|---|---|---|---|---|---|---|---|---|---|---|---|---|---|---|---|---|
| INPUT DIFFICULTY LEVEL | 1 | 3 | 2 | 3 | 1 | 3 | 2 | 3 | 1 | 3 | 2 | 3 | 1 | 3 | 2 | 3 |
| INITIAL ARRANGEMENT | 0 | . | 1 | . | 2 | . | 3 | . | 4 | . | 5 | 6 | 7 | . | 8 | 9 |
| INPUT | | | | | | | | | | | | A | | | | |
| COUNTERCLOCKWISE SEARCH | | | | | | | | | | | | B | | | | |
| REARRANGEMENT OF ITEM HAVING NO CONSTRAINT | | | | | | | | | | | | . | | | | |
| REARRANGEMENT OF X | | | | | | | | | | | | 6 | | | | |
| REARRANGEMENT OF ITEM HAVING CONSTRAINT | | | | | | | | | | | 5 | | | | | |
| REARRANGEMENT OF THE REST OF ITEMS | 0 | . | 1 | . | 2 | . | 3 | . | 4 | | | | 7 | . | 8 | 9 |
| NEW ARRANGEMENT | 0 | . | 1 | . | 2 | . | 3 | . | 4 | 5 | 6 | . | 7 | . | 8 | 9 |

IS EVALUATION FUNCTION Σ di*fi MINIMUM?

TEMPORARY REARRANGEMENT DATA

| CELL ID | c1 | c2 | ... | c16 |
|---|---|---|---|---|
| ITEM (CHARACTER) ID | i16 | i1 | ... | i15 |

US 7,884,802 B2

INFORMATION SELECTING APPARATUS AND STORAGE MEDIUM STORING INFORMATION SELECTING PROGRAM

CROSS REFERENCE OF RELATED APPLICATION

The disclosure of Japanese Patent Application No. 2007-58095 is incorporated herein by reference.

BACKGROUND OF THE INVENTION

1. Field of the Invention

The invention relates to an information selecting apparatus and a storage medium storing an information selecting program. More specifically, the present invention relates to an information selecting apparatus and a storage medium storing an information selecting program which allows a user to select an arbitrary item from a plurality of items.

2. Description of the Related Art

One example of a character input apparatus for selecting a character set in response to an operation by a direction instructing device is disclosed in Document 1 (Japanese Patent Laying-open No. 2000-10716). In the technique in the Document 1, a character set selecting line is assigned to a specific direction. In the specific direction, a character set which is brought into correspondence with an inclined angle of a stick or a load imposed on the stick is selected. By operating a determination key, the character set is selected to enter in a mode in which a character included in the character set is inputable. The respective characters are arranged at intersection points between five concentric circles and lines radially extending from the center at an angle of 30°. In an input mode, a character corresponding to a direction and an angle (or load) of the stick is selected.

In the technique in the Document 1, characters are arranged at intersection points between the concentric circles and the radial lines as described above, and therefore, at a time of selecting a character, moving the stick in a circumferential direction to instruct a specific direction and radially inclining the stick at a desired angle (or load) in the specific direction are required. Furthermore, characters are arranged at intersection points between the concentric circles and the radial lines as a mere normal arrangement, and an input frequency of the character, an input difficulty level arising from an arranged position, or the like is not considered in the arrangement of the characters. Thus, operability for a character selection is low.

SUMMARY OF THE INVENTION

Therefore, it is a primary object of the present invention to provide a novel information selecting apparatus and a storage medium storing an information selecting program.

Furthermore, another object of the present invention is to provide an information selecting apparatus and a storage medium storing an information selecting program having a high operability of an item selection.

The present invention employs following features in order to solve the above-described problems. It should be noted that reference numerals inside the parentheses and supplement shows one example of a corresponding relationship with the embodiments described later for easy understanding of the present invention, and does not limit the present invention.

A first invention is an information selecting apparatus which makes a user select an arbitrary item from a plurality of items, and having a direction input means, an operating means, a storing means, a selection item setting means, and a selecting means. The direction input means allows an input operation of a direction and inputs direction data indicative of a direction corresponding to the input operation. The operating means inputs operation data in correspondence with a predetermined operation. The storing means stores item data indicative of the plurality of items. The selection item setting means sets the predetermined number of the items out of the item data as a selection item which is assigned to a predetermined direction on the basis of an input frequency to each item. The selecting means selects from the selection item an item corresponding to the direction data from the direction input means, and outputs the item when predetermined first operation data is input.

In the first invention, an information selecting apparatus (10, 12) makes a user select an arbitrary item from a plurality of items. The plurality of items are stored in a storing means (22, 50, 222) as item data. An item is selected by a direction input by a user. Therefore, a direction input means (14, 82a, 94a) is provided to input direction data in correspondence with an input operation by the user. The direction input means may be an analog joystick, a cross key, a touch pad, etc. Furthermore, an operating means (14, 82d, 94b, 86, 88, 96) is provided to input operation data in correspondence with a predetermined operation by the user. The operating means may be a key like a button switch, etc., or an acceleration sensor, an imaging device, etc. for detecting a moving operation by the user. The operating means is utilized for determining or confirming an item selection by the direction input. A selection item setting means (46, S1) sets the predetermined number of the items out of the item data as a selection item which is assigned to a predetermined direction on the basis of an input frequency to each item. Each of the items is assigned to a predetermined direction on the basis of an input frequency with respect to the item. A selecting means (46, S11, S17, S19, S27-S31) selects from the selection item an item corresponding to the direction data, and outputs the item when predetermined first operation data is input.

According to the first invention, in an item selection by a direction input, an item is assigned to a direction on the basis of an input frequency with respect to the item. For example, an item with a high input frequency is assigned to a direction with a low input difficulty level, that is, it is possible to assign a heavy-used item to an easy-to-input direction. Thus, it is possible to improve operability of the item selection.

A second invention is an information selecting apparatus according to the first invention, and the direction input means has a polygonal guide, and the selection item setting means assigns the predetermined number of the items to a direction corresponding to a vertex of the guide and a direction corresponding to a part except for the vertex of the guide.

In the second invention, with respect to the selection item, the predetermined number of the items are assigned to a direction corresponding to a vertex of the polygonal guide (92a) and a direction corresponding to a part except for the vertex. Utilizing the guide makes it easy to input to directions corresponding to the vertexes of the polygon. For example, by assigning an item with a high input frequency to a direction corresponding to the vertex, it is possible to easily select a heavy-used item.

A third invention is an information selecting apparatus according to the first invention, and the direction input means has a input difficulty level at a plurality of levels depending on an input direction, and the selection item setting means assigns the selection item to a predetermined direction on the basis of a further input difficulty level as to the direction.

In the third invention, an input difficulty level at a plurality of levels is set to each of the input directions. For example, if a polygonal guide is provided, difficulty of a direction input is different between the vertex of the guide and the part except for the vertex, and difficulty of an input is also different between the vertexes depending on a assigned direction. A selection item is assigned to a predetermined direction on the basis of an input frequency with respect to the item and an input difficulty level with respect to the direction. Thus, an appropriate arrangement of items (assignment to the direction) taking both of an input frequency of an item and an input difficulty level of a direction can be performed, capable of improving operability of the item selection.

A fourth invention is an information selecting apparatus according to the second invention, and the direction input means has an input difficulty level at a plurality of levels depending on an input direction, and the selection item setting means assigns the selection item to a predetermined direction on the basis of an further input difficulty level as to the direction.

The fourth invention has an advantage similar to the above-described third invention.

A fifth invention is an information selecting apparatus according to the second invention, and the selection item setting means assigns a high-frequency item to a direction corresponding to a vertex of the guide on the basis of statistical information of an input frequency of the item.

In the fifth invention, a high-frequency item is assigned to a vertex of the polygonal guide, that is, a direction corresponding to an easy-to-input vertex on the basis of statistical information of an input frequency of an item, and therefore, it is possible to improve operability of an item selection.

A sixth invention is an information selecting apparatus according to the second invention, and the guide has an octagonal shape, and the selection item setting means assigns high-frequency items to directions corresponding to predetermined four vertexes of the guide on the basis of statistical information of an input frequency of the item.

In the sixth invention, the octagonal guide allows an input to eight directions like the right, left, top, bottom, and right and left oblique directions corresponding to the vertexes of the octagon. Then, high-frequency items are assigned to directions corresponding to predetermined four vertexes of the octagonal guide, for example, four directions of the right, left, top and bottom on the basis of statistical information of an input frequency of the item, and therefore, it is possible to easily input the high-frequency items.

A seventh invention is an information selecting apparatus according to the second invention, and the selection item setting means assigns an item having great amounts of information on output to a direction corresponding to a part except for the vertex of the guide.

In the seventh invention, an item having great amounts of information on output is assigned to a direction corresponding to the part except for the vertex, that is, a hard-to-input direction. Thus, even with respect to the hard-to-input direction, great amounts of information can be input at a time, capable of improving operability on the whole.

An eighth invention is an information selecting apparatus according to the first invention, and further comprises a frequency storing means for calculating and storing an input frequency to the item on the basis of a selection result by the selecting means, and the selection item setting means assigns the predetermined number of the items to a direction on the basis of an input frequency stored in the frequency storing means.

In the eighth invention, a frequency storing means (46, 50, 224, S35) calculates and stores an input frequency to the item on the basis of a result of an item selection by the user. A selection item setting means (46, S37) assigns the predetermined number of the items to a direction on the basis of the input frequency. Thus, it is possible to assign an item to a direction on the basis of an actual input frequency by a user.

A ninth invention is an information selecting apparatus according to the eighth invention, and the direction input means has a polygonal guide, and the selection item setting means assigns the predetermined number of the items to a direction corresponding to a vertex of the guide and a direction corresponding to a part except for the vertex of the guide, and performs a change of an assignment based on the input frequency such that a high-frequency item is assigned to a direction corresponding to a vertex of the guide on the basis of the input frequency stored in the frequency storing means.

In the ninth invention, the predetermined number of the items are assigned to a direction corresponding to a vertex of the guide and a direction corresponding to the part except for the vertex. Then, a change of the assignment is performed on the basis of an actual input frequency by the user, and therefore, it is possible to assign a high-frequency item to a direction corresponding to the vertex of the guide. Thus, an item heavy-used by the user can be assigned to an easy-to-input direction.

A tenth invention is an information selecting apparatus according to the eighth invention, and the selection item setting means changes a range of a direction such that a range of the direction assigned to a high-frequency item is relatively larger than ranges of directions assigned to other items on the basis of the input frequency stored in the frequency storing means.

In the tenth invention, the selection item setting means (46, S3, S35, S37) changes a range of the direction assigned to the item on the basis of an actual input frequency by the user to thereby relatively make the range assigned to the high-frequency item large. This makes it possible to relatively make the range of the direction accepting the high-frequency item large, capable of making an item heavy-selected by user easier to select.

An eleventh invention is an information selecting apparatus according to the second invention, and further comprises a temporary rearranging means for temporarily assigning, with respect to the selection item, an item except for an item assigned to the direction of the vertex of the guide to a direction corresponding to a vertex except for the vertex corresponding to the input direction until the predetermined first operation data is input when direction data indicative of a direction corresponding to the vertex of the guide is input.

In the eleventh invention, a temporary rearranging means (46, S119-S131) temporarily assigns, an item except for an item assigned to the direction of the vertex of the guide to a direction corresponding to other vertex until the determination of the item selection is instructed by the user when a direction corresponding to the vertex of the guide is input. When selecting an item assigned to a hard-to-input direction, by inputting an easy-to-input direction once, the user can temporarily assign the item to the easy-to-input direction. Thus, it is possible to easily select an item in the hard-to-input direction. Furthermore, it is possible to select an item with inputs at two levels in an easy-to-input direction.

A twelfth invention is an information selecting apparatus according to the second invention, and further comprises an interchanging means for interchanging the item assigned to the direction corresponding to the vertex of the guide and the item assigned to the direction corresponding to a part except for the vertex with respect to the selection item when predetermined second operation data is input.

In the twelfth invention, an interchanging means (46, S49-S55) interchanges the assignment of the items between the direction corresponding to the vertex of the guide and the direction corresponding to the part except for the vertex when predetermined second operation data is input. When selecting an item assigned to the hard-to-input direction, the user can assign the item to an easy-to-input direction by inputting predetermined second operation data (different from the first operation data). Thus, it is possible to easily select an item in a hard-to-input direction.

A thirteenth invention is storage medium storing an information selecting program to be executed in a computer of an information selecting apparatus having a direction input means for allowing an input operation of a direction and inputting direction data indicative of a direction corresponding to the input operation, an operating means for inputting operation data in correspondence with a predetermined operation, and a storing means for storing item data indicative of the plurality of items, and making a user select an arbitrary item from a plurality of items. The information selecting program makes a computer execute a selection item setting step, and a selecting step. The selection item setting step sets the predetermined number of the items out of the item data as a selection item which is assigned to a predetermined direction on the basis of an input frequency to each item. The selecting step selects from the selection item an item corresponding to the direction data from the direction input means, and outputs the item when predetermined first operation data is input.

The thirteenth invention is a storage medium storing an information selecting program corresponding to the information selecting apparatus in the first invention, and has an advantage similar to the above-described first invention.

A fourteenth invention is an information selecting apparatus making a user select an arbitrary item from a plurality of items. The information selecting apparatus comprises a direction input means, an operating means, a storing means, a selection item setting means, a selecting means, and a temporary rearranging means. The direction input means allows an input operation of a direction by means of a polygonal guide and inputting direction data indicative of a direction corresponding to the input operation. The operating means inputs operation data in correspondence with a predetermined operation. The storing means stores item data indicative of the plurality of items. The selection item setting means sets setting the predetermined number of the items out of the item data as a selection item which is assigned to a direction corresponding to a vertex of the guide and a direction corresponding to a part except for the vertex of the guide. The selecting means selects from the selection item an item corresponding to the direction data from the direction input means, and outputs the item when predetermined first operation data is input. The temporary rearranging means temporarily assigns, with respect to the selection item, an item except for an item assigned to the direction of the vertex of the guide to a direction corresponding to a vertex except for the vertex corresponding to the input direction until the predetermined first operation data is input when direction data indicative of a direction corresponding to the vertex of the guide is input.

In the fourteenth invention, an information selecting apparatus (10, 12) makes a user select an arbitrary item from a plurality of items. The plurality of items are stored in a storing means (22, 50, 222) as item data. An item is selected by a direction input by a user. Thus, a direction input means (14, 82a, 94a) is provided to input direction data indicative of an input operation by the user. The direction input means allows a direction input by utilizing a polygonal guide (92a), which makes it possible to easily input a direction corresponding to the vertex of the guide. The direction input means may be an analog joystick, a touch pad, for example. Furthermore, an operating means (14, 82d, 94b, 86, 88, 96) is provided to input operation data in correspondence with a predetermined operation by the user. The operating means is a key like a button switch, etc., or an acceleration sensor and an imaging device for detecting a motion by a user operation. The operating means is utilized for determining or confirming selection of an item by a direction input. A selection item setting means (46, S1) performs a setting the selection item, and with respect to the selection item, the predetermined number of the items out of the item data is assigned to a direction corresponding to a vertex of the guide and a direction corresponding to a part except for the vertex. A selecting means (46, S11, S17, S19, S27-S31) selects an item corresponding to the direction data from the selection item, and outputs the item when predetermined first operation data is input. A temporary rearranging means (46, S119-S131) temporarily assigns an item except for an item assigned to the direction of the vertex to a direction corresponding to other vertexes until determination of an item selection is instructed by the user when direction data indicative of a direction corresponding to the vertex of the guide is input.

According to the fourteenth invention, when selecting an item assigned to a hard-to-input direction, by inputting an easy-to-input direction once, the user can temporarily assign the item to the easy-to-input direction. Thus, it is possible to easily select an item in the hard-to-input direction. Furthermore, it is possible to select an item only by inputs in the easy-to-input direction. Thus, in the item selection in correspondence with a direction input, it is possible to improve operability of the item selection.

A fifteenth invention is a storage medium storing an information selecting program to be executed in a computer of an information selecting apparatus having a direction input means for allowing an input operation of a direction by means of a polygonal guide and inputting direction data indicative of a direction corresponding to the input operation, an operating means for inputting operation data in correspondence with a predetermined operation, and a storing means for storing item data indicative of the plurality of items, and making a user select an arbitrary item from a plurality of items. The information selecting program makes a computer execute a selection item setting step, a selecting step, and a temporary rearranging step. The selection item setting step sets the predetermined number of the items out of the item data as a selection item which is assigned to a direction corresponding to a vertex of the guide and a direction corresponding to a part except for the vertex of the guide. The selecting step selects from the selection item an item corresponding to the direction data from the direction input means, and outputs the item when predetermined first operation data is input. The temporary rearranging step temporarily assigns, with respect to the selection item, an item except for an item assigned to the direction of the vertex of the guide to a direction corresponding to a vertex except for the vertex corresponding to the input direction until the predetermined first operation data is input when direction data indicative of a direction corresponding to the vertex of the guide is input.

The fifteenth invention is a storage medium storing an information selecting program corresponding to the information selecting apparatus in the fourteenth invention, and has an advantage similar to that of the fourteenth invention.

A sixteenth invention is an information selecting apparatus making a user select an arbitrary item from a plurality of items. The information selecting apparatus has a direction input means, an operating means, a storing means, a selection item setting means, a selecting means, and an interchanging means. The direction input means allows an input operation of a direction by means of a polygonal guide and inputs direction data indicative of a direction corresponding to the input operation. The operating means inputs operation data in correspondence with a predetermined operation. The storing means stores item data indicative of the plurality of items. The selection item setting means sets the predetermined number of the items out of the item data as a selection item which is assigned to a direction corresponding to a vertex of the guide and a direction corresponding to a part except for the vertex of the guide. The selecting means selects from the selection item an item corresponding to the direction data from the direction input means, and outputs the item when predetermined first operation data is input. The interchanging means interchanges the item assigned to the direction corresponding to the vertex of the guide and the item assigned to the direction corresponding to a part except for the vertex with respect to the selection item when predetermined second operation data is input.

In the sixteenth invention, an information selecting apparatus (10, 12) makes a user select an arbitrary item from a plurality of items. The plurality of items are stored in a storing means (22, 50, 222) as item data. An item is selected by a direction input by a user. Thus, a direction input means (14, 82a, 94a) is provided to input direction data indicative of an input operation by the user. The direction input means allows a direction input by utilizing a polygonal guide (92a), which makes it possible to easily input a direction corresponding to the vertex of the guide. The direction input means may be an analog joystick, a touch pad, etc. for example. Furthermore, an operating means (14, 82d, 94b, 86, 88, 96) is provided to input operation data in correspondence with a predetermined operation by the user. The operating means is a key like a button switch, etc., or an acceleration sensor and an imaging device for detecting a motion by a user operation. The operating means is utilized for determining or confirming selection of an item by a direction input. A selection item setting means (46, S1) performs a setting the selection item, and with respect to the selection item, the predetermined number of the items out of the item data is assigned to a direction corresponding to a vertex of the guide and a direction corresponding to a part except for the vertex. A selecting means (46, S11, S17, S19, S27-S31) selects an item corresponding to the direction data from the selection item, and outputs the item when predetermined first operation data is input. An interchanging means (46, S49-S55) interchanges the item assignment between the direction corresponding to the vertex of the guide and the direction corresponding to a part except for the vertex when predetermined second operation data is input.

According to the sixteenth invention, when selecting an item assigned to a hard-to-input direction, the user can assign the item to an easy-to-input direction by inputting predetermined second operation data (different from the first operation data). Thus, in the item selection according to the direction input, it is possible to easily select an item in the hard-to-input direction, capable of improving operability of the item selection.

A seventeenth invention is a storage medium storing an information selecting program to be executed in a computer of an information selecting apparatus having a direction input means for allowing an input operation of a direction by means of a polygonal guide and inputting direction data indicative of a direction corresponding to the input operation, an operating means for inputting operation data in correspondence with a predetermined operation, and a storing means for storing item data indicative of the plurality of items, and making a user select an arbitrary item from a plurality of items. The information selecting program makes a computer execute a selection item setting step, a selecting step, and an interchanging step. The selection item setting step sets the predetermined number of the items out of the item data as a selection item which is assigned to a direction corresponding to a vertex of the guide and a direction corresponding to a part except for the vertex of the guide. The selecting step selects from the selection item an item corresponding to the direction data from the direction input means, and outputting the item when predetermined first operation data is input. The interchanging step interchanges the item assigned to the direction corresponding to the vertex of the guide and the item assigned to the direction corresponding to a part except for the vertex with respect to the selection item when predetermined second operation data is input.

The seventeenth invention is a storage medium storing an information selecting program corresponding to the information selecting apparatus in the sixteenth invention, and has an advantage similar to that of the above-described the sixteenth invention.

According to the present invention, in the item selection according to the direction input, an item is assigned to a direction on the basis of an input frequency, capable of improving operability of the item selection.

Furthermore, in a case that the direction input means is provided with a polygonal guide, items except for the items assigned to the directions of the vertexes are temporarily assigned to the directions corresponding to other vertexes in accordance with the user inputting in a vertex direction, and therefore, it is possible to easily select an item assigned to the hard-to-input direction.

Furthermore, in a case that the direction input means is provided with a polygonal guide, the items assigned to the directions corresponding to the vertexes of the guide and the item assigned to the parts except for the vertexes are interchanged in response to a predetermined operation, capable of easily selecting an item assigned to the hard-to-input direction.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing one example of an appearance of a first controller, FIG. 3 (A) is a perspective view of the first controller as seeing it from above rear, and FIG. 3 (B) is a perspective view of the first controller as seeing it from below front;

FIG. 4 is an illustrative view showing one example of an appearance of a second controller, FIG. 4 (A) is a perspective view of the second controller as seeing it from above rear, and FIG. 4 (B) is a perspective view of the second controller as seeing it from below front;

FIG. 13 is an illustrative view showing one example of an item data;

FIG. 17 is an illustrative view showing input frequency data of the items;

FIG. 18 is an illustrative view showing one example of an arrangement of high-frequency items, FIG. 18 (A) shows an arrangement of them at octagonal vertexes, and FIG. 18 (B) shows an arrangement of them at predetermined four vertexes of the octagon;

FIG. 21 is an illustrative view showing an allocation method of acceptable angles based on an input difficulty level and an input frequency;

FIG. 22 is an illustrative view showing cell angle data indicative of an acceptable angle of each cell;

DETAILED DESCRIPTION OF THE PREFERRED EMBODIMENTS

Figure 1:
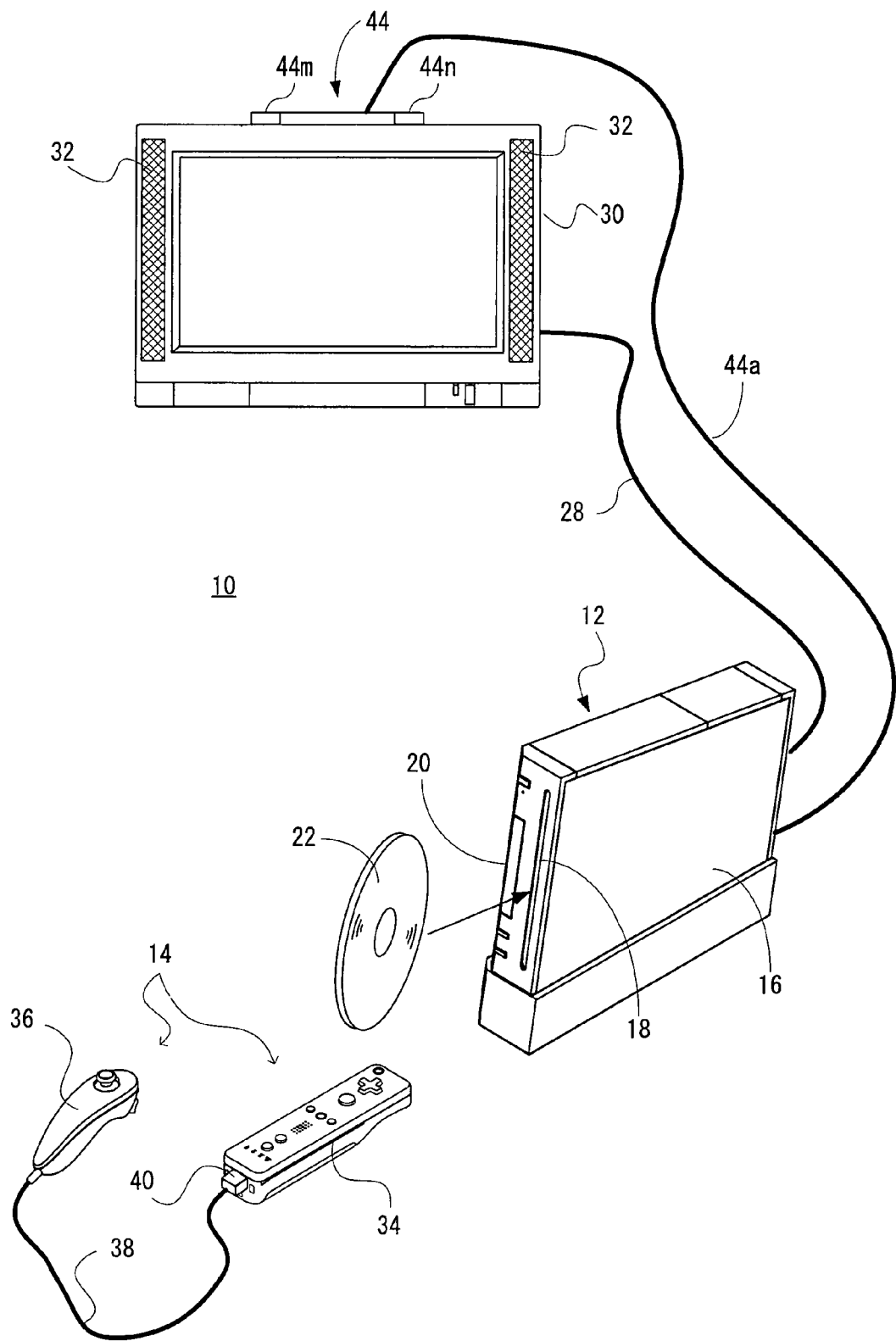
FIG. 1 is an illustrative view showing an appearance of a game system in one embodiment of the present invention.

Referring to FIG. 1, an information selecting apparatus 10 of one embodiment of the present invention is realized in a form of a game system. Additionally, the information selecting apparatus 10 may be realized in a form of a personal computer, a mobile phone, a hand-held terminal, etc. without being limited to the game system.

The information selecting apparatus, that is, the game system 10 includes a game apparatus 12 and a controller 14. The game apparatus 12 is a game console. The controller 14 is an input device or an operating device by a user or a player. The game apparatus 12 and the controller 14 are connected by radio. The wireless communication is executed according to a Bluetooth® standard, for example, but may be executed by other standards such as a wireless LAN.

The game apparatus 12 includes a roughly rectangular parallelepiped housing 16, and the housing 16 is furnished with a disk slot 18 and a memory card slot cover 20 on a front surface. An optical disk 22 as one example of an information storage medium storing game program and data, etc. is inserted from the disk slot 18 to be loaded into a disk drive 24 (see FIG. 2) within the housing 16. Inside the memory card slot cover 20 is provided a memory card slot through which an external memory card 26 (FIG. 2) is inserted. The memory card 26 is employed for loading the game program, etc. read from the optical disk 22 to temporarily store it, storing (saving) game data (result data or proceeding data of the game) of the game played by means of the game system 10, and so forth. It should be noted that storing the game data described above may be performed on an internal memory such as a flash memory in place of the external memory card 26.

The game apparatus 12 has an AV cable connector (not illustrated) on a rear surface of the housing 16, and by means of the connector, the game apparatus 12 is connected to a monitor (display) 30 via an AV cable 28. The monitor 30 is typically a color television receiver, and through the AV cable 28, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 30, and a stereo game sound, such as a game music, a sound effect is output from integrated speakers 32.

Furthermore, the power of the game apparatus 12 is applied by means of a general AC adapter (not illustrated). The AC adapter is inserted into a standard wall socket for home use, and transforms the house current to a low DC voltage signal suitable for driving the game apparatus 12. In another embodiment, a battery may be utilized as a power supply.

The controller 14, which is described in detail later, includes a first controller 34 and a second controller 36 each capable of being held with one hand as a first operation unit and a second operation unit, respectively. A cable 38 has one end extending from the rear end of the second controller 36 and the other end provided with a connector 40. The connector 40 is connected to a connector 42 (FIG. 3, FIG. 5) provided on a rear end surface of the first controller 34. Input data obtained by the second controller 36 is applied to the first controller 34 through the cable 38. The first controller 34 transmits controller data including the input data of the first controller 34 itself and the input data of the second controller 36.

In the game system 10, a user turns the power of the game apparatus 12 on for playing the game (or other applications), then selects an appropriate optical disk 22 storing a video game (or other applications the player wants to play), and loads the optical disk 22 into the disk drive 24 through the disk slot 18 of the game apparatus 12. In response thereto, the game apparatus 12 starts to execute a video game or other applications on the basis of the software stored in the optical disk 22. The user operates the controller 14 in order to apply an input to the game apparatus 12.

Additionally, around the monitor 30 (upper side in this embodiment), a sensor bar 44 is provided, and the sensor bar 44 is provided with two LED modules (hereinafter referred to as "marker") 44*m* and 44*n* at a predetermined interval. By utilizing the sensor bar 44, as described later, the controller 14 (first controller 34) functions as a pointing device for pointing a position on the screen. Each of the markers 44*m* and 44*n* is an infrared LED, and outputs infrared light toward the front of the monitor 30. A cable 44*a* extending from the sensor bar 44 is connected to a connector (not illustrated) on a rear surface of the game apparatus 12, and a power is supplied to the markers 44*m* and 44*n* from the game apparatus 12.

Figure 2:
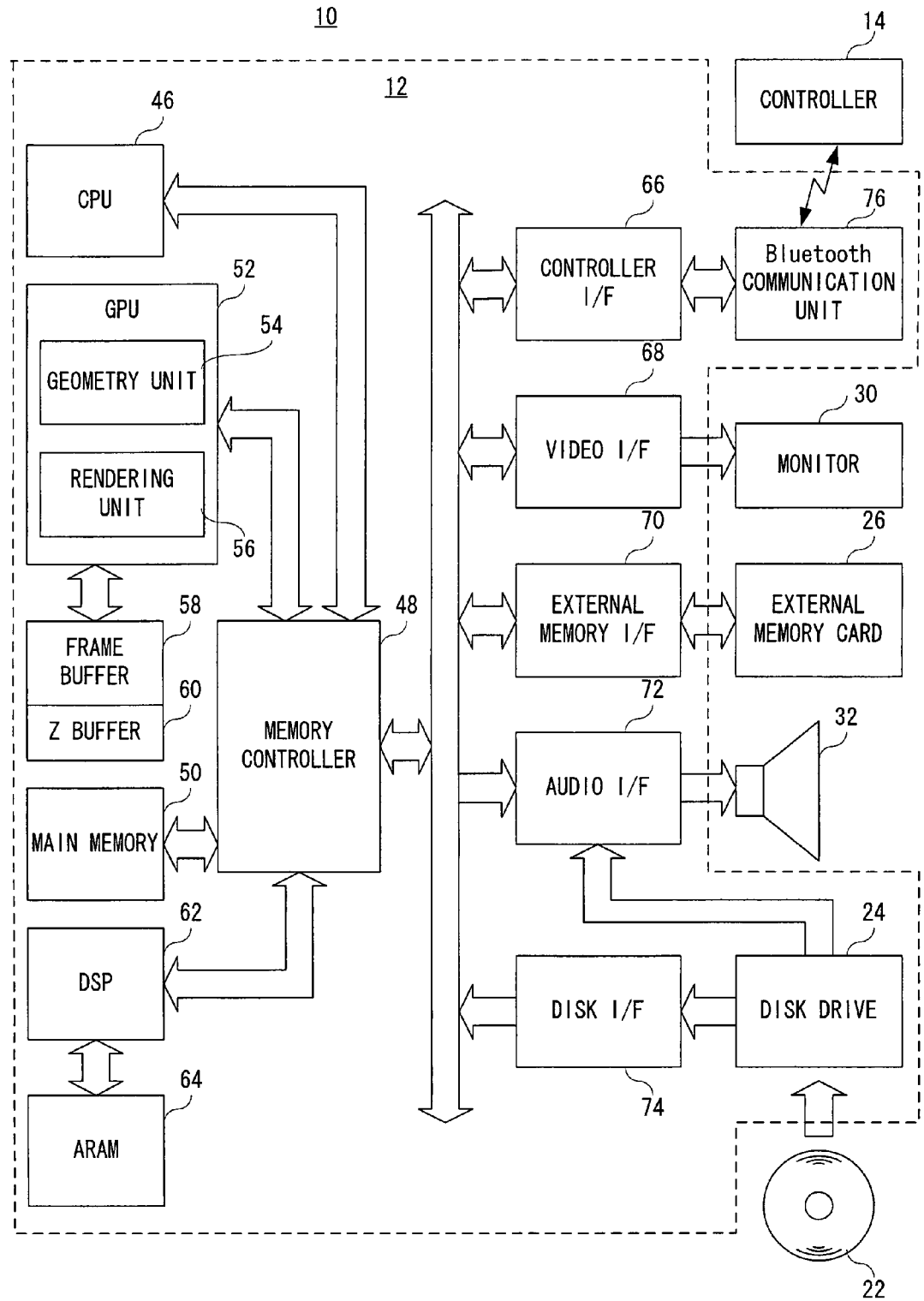
FIG. 2 is a block diagram showing one example of an electric configuration of the game system.

FIG. 2 is a block diagram showing an electric configuration of the game system 10. The game apparatus 12 includes a CPU 46. The CPU 46 functions as a game processor, and is a computer for overall controlling the game apparatus 12. The CPU 46 is connected with a memory controller 48 via a bus. The memory controller 48 mainly controls writing and reading of a main memory 50 connected via a bus under the control of the CPU 46. The memory controller 48 is connected with a GPU (Graphics Processing Unit) 52.

The GPU 52 forms a part of a rendering means, and is constituted by a single chip ASIC, for example, receives a graphics command (rendering instruction) from the CPU 46 via the memory controller 48, and by following the command thus received, generates a 3D game image by a geometry unit 54 and a rendering unit 56. Namely, the geometry unit 54 performs coordinates arithmetic processing of rotation, movement, and deformation, etc, of each kind of object of a three dimensional coordinate system. The object is formed of a plurality of polygons (the polygon here refers to a polygonal plane defined by at least three vertexes coordinates.) The rendering unit 56 performs image generation processing such as attaching a texture (texture image) to each polygon of each kind of object, and so forth. Accordingly, 3D image data to be displayed on the game screen is generated by the GPU 52, and the image data is stored in a frame buffer 58.

Note that necessary data (primitive or polygon and texture, etc) required to execute the graphics command by the GPU 52 is obtained from the main memory 50 via the memory controller 48 by the GPU 52.

The frame buffer 58 is a memory for drawing (accumulating) one frame of image data of a raster scan monitor 30, for example, and is overwritten for every frame by the GPU 52. Specifically, the frame buffer 58 sequentially stores chromatic information of an image for each pixel. Here, the chromatic information refers to data on R, G, B and A, and corresponds to R (red) data of 8 bits, G (green) data of 8 bits, B (blue) data of 8 bits, and A (alpha) data of 8 bits, for example. Note that A data is the data on a mask (mat image). Additionally, a video I/F 68 to be described later reads the data in the frame buffer 58 via the memory controller 48 to thereby display a game image on the monitor 30.

In addition, a Z buffer 60 has a storage capacity equivalent to (the number of pixels corresponding to the frame buffer 58×the number of bits of the depth data per one pixel), and stores depth information or depth data (Z value) of dots corresponding to each storage location of the frame buffer 58.

Both of the frame buffer 58 and the Z buffer 60 may be constituted by using one portion of the main memory 50, and also these buffers may be provided inside the GPU 52.

The memory controller 48 is furthermore connected to a RAM for audio (referred to as "ARAM" hereafter) 64 via a DSP (Digital Signal Processor) 62. Accordingly, the memory controller 48 controls writing and/or reading of the ARAM 64 as a sub-memory as well as that of the main memory 50.

The DSP 62 works as a sound processor, and generates audio data corresponding to sound, voice or music necessary for the game, by using sound data stored in the main memory 50 and by using sound wave (tone) data written in the ARAM 64.

The memory controller 48 is further connected to respective interfaces (I/F) 64, 66, 68, 70, 72, and 74 by the bus. The controller I/F 66 is an interface for the controller 14 connected to the game apparatus 12 via a Bluetooth communication unit 76. More specifically, the Bluetooth communication unit 76 is a communication device for the main body, and receives controller data (input data) sent from a radio module 78 (FIG. 5), that is, a communication device of the controller 14. The controller I/F 66 applies the controller data received through the Bluetooth communication unit 76 to the CPU 46 through the memory controller 48. The video I/F 68 accesses the frame buffer 58 to read the image data generated by the GPU 52, and applies the image signal or the image data (digital RGBA pixel value) to the monitor 30 via the AV cable 28 (FIG. 1).

The external memory I/F 70 associates the external memory card 26 to be inserted into the front surface of the game apparatus 12 with the memory controller 48. Whereby, the CPU 46 can write the data into the memory card 26, or can read out the data from the memory card 26, via the memory controller 48. The audio I/F 72 receives audio data given from the DSP 62 or an audio stream read from the optical disk 22, through the memory controller 48, and gives audio signals (sound signal) corresponding thereto to the speakers 32 of the monitor 30.

The disk I/F 74 connects the disk drive 24 to the memory controller 48 to thereby allow the CPU 46 to control the disk drive 24. The program and data read out from the optical disk 22 by this disk drive 24 are written into the main memory 50 under the control of the CPU 46. The CPU 46 executes a process for the game or the application according to this program.

FIG. 3 shows one example of an external appearance of the first controller 34. FIG. 3 (A) is a perspective view of the first controller 34 as seeing it from above rear, and FIG. 3 (B) is a perspective view of the first controller 34 as seeing it from below front.

The first controller 34 has a housing 80 formed by plastic molding, for example. The housing 80 is formed into an approximately rectangular parallelepiped shape regarding a back and forth direction (Z-axis direction shown in FIG. 3) as a longitudinal direction, and has a size small enough to be held by one hand of a child and an adult. As one example, the housing 80 has a length or a width approximately the same as that of the palm of the person. A player can perform a game operation by means of the first controller 34, that is, by pushing buttons provided on it and by changing a position and a direction of the first controller 34 itself.

The housing 80 is provided with a plurality of operation buttons (operation key). That is, on the top surface of the housing 80, a cross key 82a, a 1 button 82b, a 2 button 82c, an A button 82d, a −button 82e, a menu button 82f, and a +button 82g are provided. Meanwhile, on the bottom surface of the housing 80, a concave portion is formed, and on the reward inclined surface of the concave portion, a B button 82h is provided. Each of the buttons (switches) 82a-82h is assigned an appropriate function according to a game program to be executed by the game apparatus 12. Furthermore, the housing 80 has a power switch 82i for turning on/off the power of the main body of the game apparatus 12 from a remote place on a top surface. The respective buttons (switches) provided on the first controller 34 may inclusively be indicated with the use of the reference numeral 82.

At the back surface of the housing 80, the above-described connector 42 is provided. The connector 42 is a 32 pin edge connector, for example, and utilized for connecting other devices to the first controller 34. In this embodiment, the connector 42 is connected with the connector 40 of the second controller 36. At the back end of the top surface of the housing 80, a plurality of LEDs 84 are provided, and the plurality of LEDs 84 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the order connected, for example. Each LED 84 corresponds to a controller number, and the LED 84 corresponding to the controller number lights up.

Furthermore, inside the housing 80 of the first controller 34, an acceleration sensor 86 (FIG. 5) is provided. As an acceleration sensor 86, acceleration sensors of an electrostatic capacity type can typically be utilized. The acceleration sensor 86 detects accelerations of a linear component for each sensing axis and gravitational acceleration out of the accelerations applied to a detection portion of the acceleration sensor. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34.

It should be noted that as an acceleration sensor 86, two-axis acceleration sensors may be utilized for detecting any two of the directions of the accelerations out of the up and down direction, the right and left direction and the back and forth direction according to the shape of the housing 80, the limitation on how to hold the first controller 34, or the like. Under certain circumstances, a one-axis acceleration sensor may be used.

Figure 5:
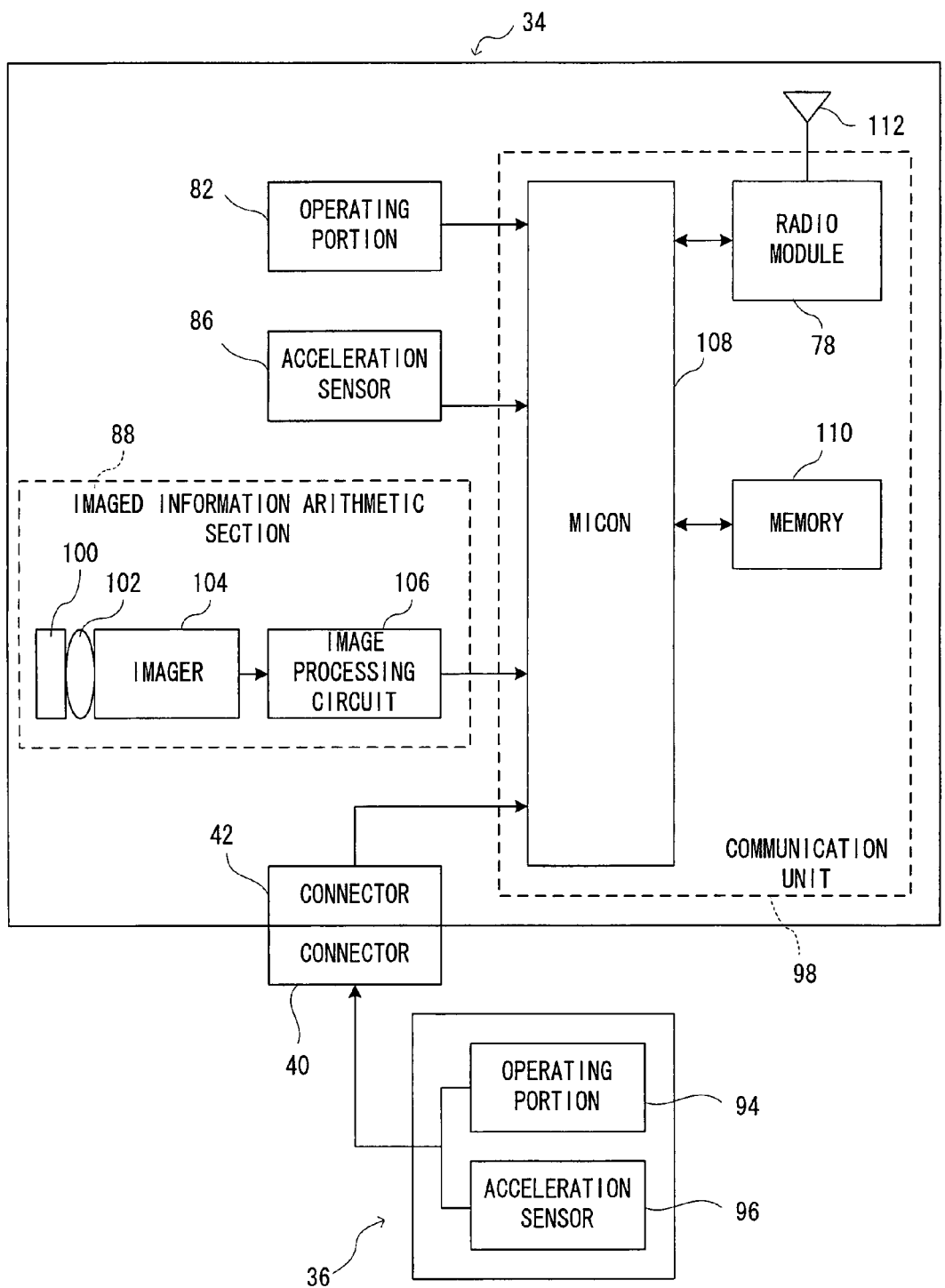
FIG. 5 is a block diagram showing one example of an electric configuration of the controllers.

In addition, the first controller 34 has an imaged information arithmetic section 88 (see FIG. 5). As shown in FIG. 3 (B), on the front end surface of the housing 80, a light incident opening 90 of the imaged information arithmetic section 88 is provided, and from the light incident opening 90, infrared rays emitted by the markers 44m and 44n of the sensor bar 44 are captured.

FIG. 4 shows one example of an appearance of the second controller 36. FIG. 4 (A) is a perspective view of the second controller 36 as seeing it from above rear, and FIG. 4 (B) is a perspective view of the second controller 36 as seeing it from below front. Additionally, in FIG. 4, the cable 38 of the second controller 36 is omitted.

The second controller 36 has a housing 92 formed by plastic molding, for example. The housing 92 is formed into an approximately thin long elliptical shape in the forward and backward directions (Z-axis direction in FIG. 4) when viewed from plane, and the width of the right and left direction (X-axis direction in FIG. 4) at the back end is narrower than that of the front end. Furthermore, the housing 92 has a curved shape as a whole when viewed from a side, and downwardly curved from a horizontal portion at the front end to the back end. The housing 92 has a size small enough to be held by one hand of a child and an adult similar to the first controller 34 as a whole, and has a longitudinal length (in the Z-axis direction) slightly shorter than that of the housing 80 of the first controller 34. Even with the second controller 36, the player can perform a game operation by operating buttons and a stick, and by changing a position and a direction of the controller by moving itself.

At the end of the top surface of the housing 92, an analog joystick 94a is provided. At the end of the housing 92, a front edge slightly inclined backward is provided, and on the front edge are provided a C button 94b and a Z button 94c vertically arranged (Y-axis direction in FIG. 4). The analog joystick 94a and the respective buttons 94b and 94c are assigned appropriate functions according to a game program to be executed by the game apparatus 12. The analog joystick 94a and the respective buttons 94b and 94c provided to the second controller 36 may be inclusively denoted by means of the reference numeral 94.

Inside the housing 92 of the second controller 36, an acceleration sensor 96 (FIG. 5) is provided. As the acceleration sensor 96, an acceleration sensor similar to the acceleration sensor 86 in the first controller 34 is applied. More specifically, the three-axis acceleration sensor is applied in this embodiment, and detects accelerations in the respective three axis directions like an up and down direction (Y-axial direction shown in FIG. 4), a right and left direction (X-axial direction shown in FIG. 4), and a forward and backward direction (Z-axial direction shown in FIG. 4) of the second controller 36.

Additionally, the shapes of the first controller 34 shown in FIG. 3 and the second controller 36 shown in FIG. 4 and the shape, the number and the setting position of the buttons (switches, stick, or the like), etc. are merely one example, and can be changed to other shapes, numbers and setting positions, etc. as needed.

Furthermore, the controller 14 is powered by a battery (not illustrated) detachably incorporated in the first controller 34. The second controller 36 is powered through the connector 42, the connector 40, and the cable 38.

FIG. 5 shows one example of an electric configuration of the controller 14 when the first controller 34 and the second controller 36 are connected with each other.

The first controller 34 incorporates a communication unit 98, and the communication unit 98 is connected with the operating portion 82, the acceleration sensor 86, the imaged information arithmetic section 88 and the connector 42. The operating portion 82 indicates the above-described operation buttons or operating switches 82a-82i. When the operating portion 82 is operated, an operation signal (key information) is applied to the communication unit 98.

The data indicative of acceleration detected by the acceleration sensor 86 is output to the communication unit 98. The acceleration sensor 86 has in the order of a maximum sampling period of 200 frames per second.

The data taken in by the imaged information arithmetic section 88 is also output to the communication unit 98. The imaged information arithmetic section 88 is constituted by an infrared filter 100, a lens 102, an imager 104 and an image processing circuit 106. The infrared filter 100 passes only infrared rays from the light incident from the light incident opening 90 at the front of the first controller 34. As described above, the markers 44m and 44n of the sensor bar 44 placed near (around) the display screen of the monitor 30 are infrared LEDs for outputting infrared lights forward the monitor 30. Accordingly, by providing the infrared filter 100, it is possible to image the image of the markers 44m and 44n more accurately. The lens 102 condenses the infrared rays passing thorough the infrared filter 100 to emit them to the imager 104. The imager 104 is a solid imager, such as a CMOS sensor and a CCD, for example, and images the infrared rays condensed by the lens 102. Accordingly, the imager 104 images only the infrared rays passing through the infrared filter 100 to generate image data. Hereafter, the image imaged by the imager 104 is called an "imaged image". The image data generated by the imager 104 is processed by the image processing circuit 106. The image processing circuit 106 calculates positions of objects to be imaged (markers 44m and 44n) within the imaged image, and outputs marker coordinates data including each coordinate value indicative of the position to the communication unit 98 for each predetermined time (one frame, for example). It should be noted that a description of the image processing circuit 106 is made later.

The connector 42 is connected with the connector 40 of the cable 38 extending from the second controller 36. The connector 40 is connected with the operating portion 94 and the acceleration sensor 96 of the second controller 36. The operating portion 94 denotes the above-described analog joystick 94a and operation buttons 94b and 94c. When the operating portion 94 is operated, an operation signal is applied to the communication unit 98 via the cable 38, the connector 40, the connector 42, etc. The acceleration sensor 96 also has a sampling period similar to that of the acceleration sensor 86, and applies the data indicative of the detected acceleration to the communication unit 98.

The communication unit 98 includes a microcomputer (micon) 108, a memory 110, a radio module 78 and an antenna 112. The micon 108 transmits the obtained data to the game apparatus 12 and receives data from the game apparatus 12 by controlling the radio module 78 while using the memory 110 as a memory area (working area and buffer area) in processing.

The data output from the operating portion 82, the acceleration sensor 86 and the imaged information arithmetic section 88 of the first controller 34, and the operating portion 94 and acceleration sensor 96 of the second controller 36 to the micon 108 is temporarily stored in the memory 110. The radio transmission from the communication unit 98 to the Bluetooth communication unit 76 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 108 outputs data including the operation data of the operating portions 82 and 94 and the acceleration data of the acceleration sensors 86 and 96, and marker coordinates data from the imaged information arithmetic section 88 stored in the memory 110 to the radio module 78 as controller data when transmission timing to the game apparatus 12 has come. The radio module 78 modulates a carrier of a predetermined frequency by the controller data, and emits its weak radio wave signal from the antenna 112 by using a short-range wireless communication technique, such as Bluetooth™. Namely, the controller data is modulated to the weak radio wave signal by the radio module 78 and transmitted from the first controller 34. The weak radio wave signal is received by the Bluetooth communication unit 76 of the game apparatus 12. The weak radio wave thus received is subjected to demodulating and decoding processing, thus making it possible for the game apparatus 12 to obtain the controller data. The CPU 46 of the game apparatus 12 performs the game processing on the basis of the controller data obtained from the controller 14.

It will be appreciated by those skilled in the art from the description of this specification that a computer, such as a processor (CPU 46, for example) of the game apparatus 12 or the processor (micon 108, for example) of the controller 14 executes processing on the basis of an acceleration signal output from the acceleration sensors 86 and 96, and whereby, more information relating to the controller 14 can be estimated or calculated (determined). In a case that processing is executed on the side of the computer assuming that the first controller 34 and second controller 36 respectively incorporated with the acceleration sensors 86 and 96 are in a static state (that is, processing is executed considering that accelerations detected by the acceleration sensors 86 and 96 are only gravitational accelerations), if the first controller 34 and the second controller 36 are actually in a static state, it is possible to know whether or not the orientations of the first controller 34 and the second controller 36 are inclined with respect to the direction of gravity or to what extent they are inclined on the basis of the detected acceleration. More specifically, when a state in which the detection axes of the acceleration sensors 86 and 96 are directed to a vertically downward direction is taken as a reference, merely whether or not 1 G (gravitational acceleration) is imposed on can show whether or not each of the first controller 34 and the second controller 36 is inclined, and the size can show to what extent each of them is inclined. Furthermore, if a multi-axes acceleration sensor is applied, by further performing processing on an acceleration signal of each axis, it is possible to more precisely know to what extent the first controller 34 and the second controller 36 is inclined with respect to the direction of gravity. In this case, on the basis of outputs from the acceleration sensors 86 and 96, the computer may perform processing of calculating data of inclined angles of the first controller 34 and second controller 36, but perform processing of estimating an approximate inclination on the basis of the outputs from the acceleration sensors 86 and 96 without performing the processing of calculating the data of the inclined angle. Thus, by using the acceleration sensors 86 and 96 in conjunction with the computer, it is possible to determine an inclination, an orientation or a position of each of the first controller 34 and second controller 36.

On the other hand, assuming that the acceleration sensors 86 and 96 are in a dynamic state, accelerations according to the movement of the acceleration sensors 86 and 96 are detected in addition to the gravitational acceleration component, and therefore, if the gravitational acceleration component is removed by predetermined processing, it is possible to know a moving direction, etc. More specifically, in a case that the first controller 34 and the second controller 36 respectively being furnished with the acceleration sensors 86 and 96 are accelerated and moved by the hands of the user, acceleration signals generated by the acceleration sensors 86 and 96 are processed by the above-described computer, and whereby, it is possible to calculate various movements and/or positions of the first controller 34 and the second controller 36. Additionally, even when assuming that the acceleration sensors 86 and 96 are in a dynamic state, if an acceleration in correspondence with the movement of each of the acceleration sensors 86 and 96 is removed by the predetermined processing, it is possible to know the inclination with respect to the direction of gravity. In another embodiment, each of the acceleration sensors 86 and 96 may contain a built-in signal processing apparatus or other kinds of dedicated processing apparatuses for performing desired processing on the acceleration signal output from the incorporated acceleration detecting means before outputting the signal to the micon 108. For example, in a case that the acceleration sensors 86 and 96 are ones for detecting a static acceleration (gravitational acceleration, for example), the built-in or dedicated processing apparatuses may be ones for transforming the detected acceleration signal into the inclined angle (or other preferable parameters) corresponding thereto.

Figure 6:
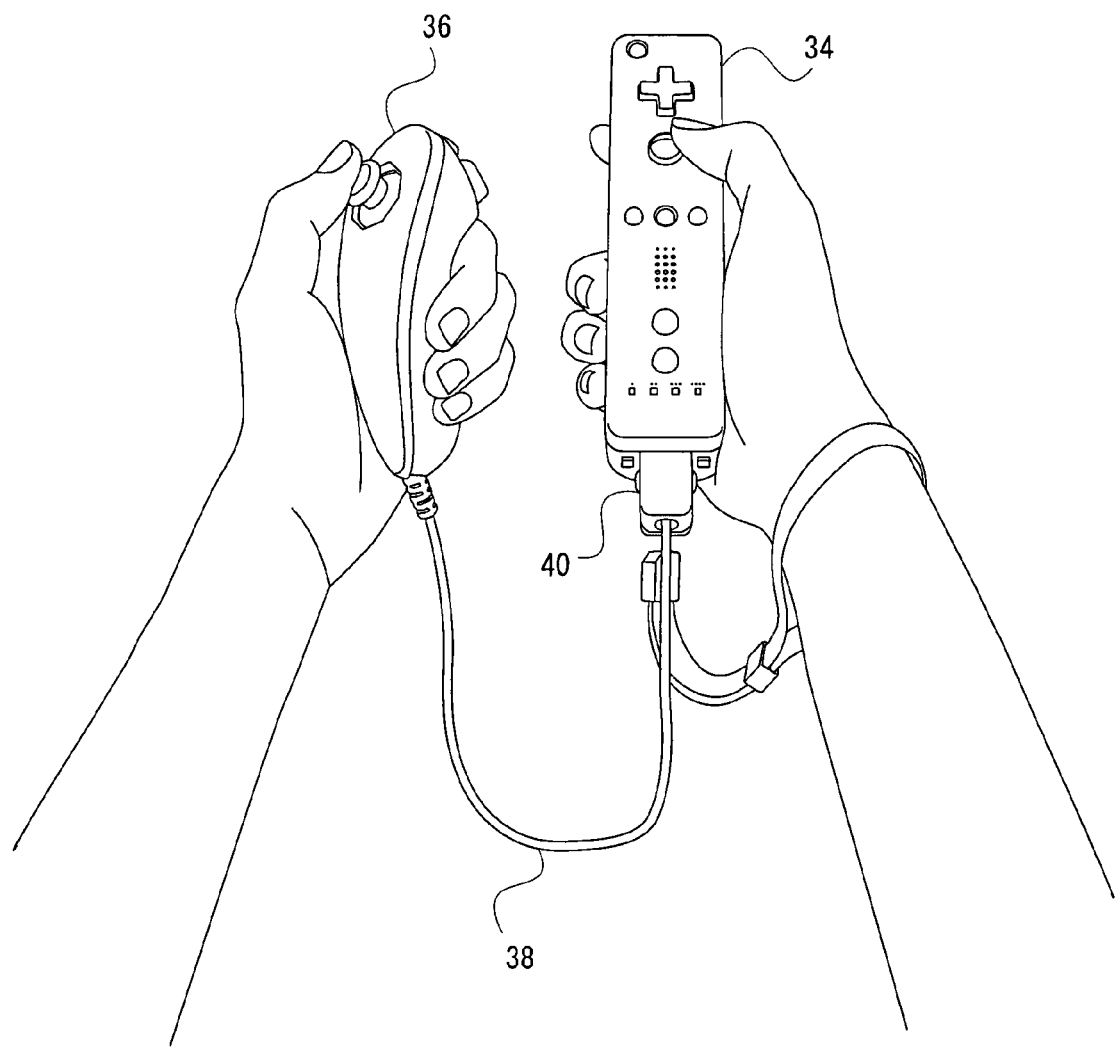
FIG. 6 is an illustrative view showing a first controller and a second controller respectively held with a right hand and a left hand of a user.

In this game system 10, a user can make an operation or input to the game by moving the controller 14. In playing the game, for example, the user holds the first controller 34 with the right hand and the second controller 36 with the left hand as shown in FIG. 6. As described above, in this embodiment, the first controller 34 is incorporated with the acceleration sensor 86 for detecting accelerations in the three-axis directions, and the second controller 36 is also incorporated with the same acceleration sensor 96. When the first controller 34 and the second controller 36 are moved by the user, acceleration values respectively indicating the movements of the controllers are detected by the acceleration sensor 86 and the acceleration sensor 96. In the game apparatus 12, game processing can be executed according to the detected acceleration values.

Furthermore, the first controller 34 is provided with the imaged information arithmetic section 88, and this makes it possible for the user to utilize the first controller 34 as a pointing device. In this case, the user holds the first controller 34 with the edge surface (light incident opening 90) of the first controller 34 directed to the markers 44m and 44n. It should be noted that as understood from FIG. 1, the markers 44m and 44n are placed around a predetermined side (top or bottom) of the monitor 30 in parallel with a predetermined side. In this state, the user can perform a game operation by changing a position on the screen instructed with the first controller 34 by moving the first controller 34 itself, and by changing distances between the first controller 34 and each of the markers 44m and 44n.

Figure 7:
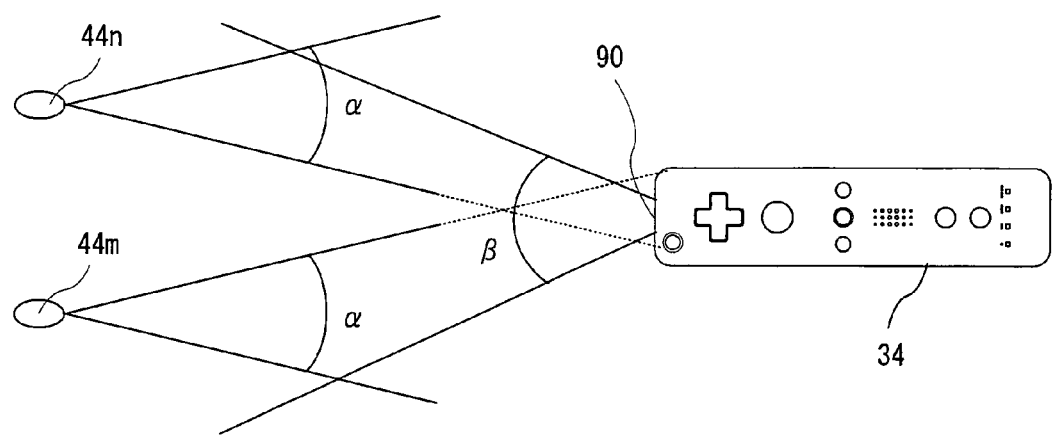
FIG. 7 is an illustrative view showing a viewing angle of the marker and the first controller shown in FIG. 1.

FIG. 7 is a view explaining viewing angles between the respective markers 44m and 44n, and the first controller 34. As shown in FIG. 7, each of the markers 44m and 44n emits infrared ray within a range of a viewing angle α. Also, the imager 104 of the imaged information arithmetic section 88 can receive incident light within the range of the viewing angle β taking the line of sight of the first controller 34 (Z axis direction in FIG. 3) as a center. For example, the viewing angle α of each of the markers 44m and 44n is 34° (half-value angle) while the viewing angle β of the imager 104 is 42°. The user holds the first controller 34 such that the imager 104 is directed and positioned so as to receive the infrared rays from the markers 44m and 44n. More specifically, the user holds the first controller 34 such that at least one of the markers 44m and 44n exists in the viewing angle β of the imager 104, and the first controller 34 exists in at least one of the viewing angles α of the marker 44m or 44n. In this state, the first controller 34 can detect at least one of the markers 44m and 44n. The user can perform a game operation by changing the position and the orientation of the first controller 34 in the range satisfying the state. Also, in a case that any one of the makers 44m and 44n is only detected, by setting temporary marker coordinates in place of the other marker which is not detected by means of data detecting the previous two makers 44m and 44n, an instructed position by the first controller 34 can be calculated.

If the position and the orientation of the first controller 34 are out of the range, the game operation based on the position and the orientation of the first controller 34 cannot be performed. Hereafter, the above-described range is called an "operable range."

Figure 8:
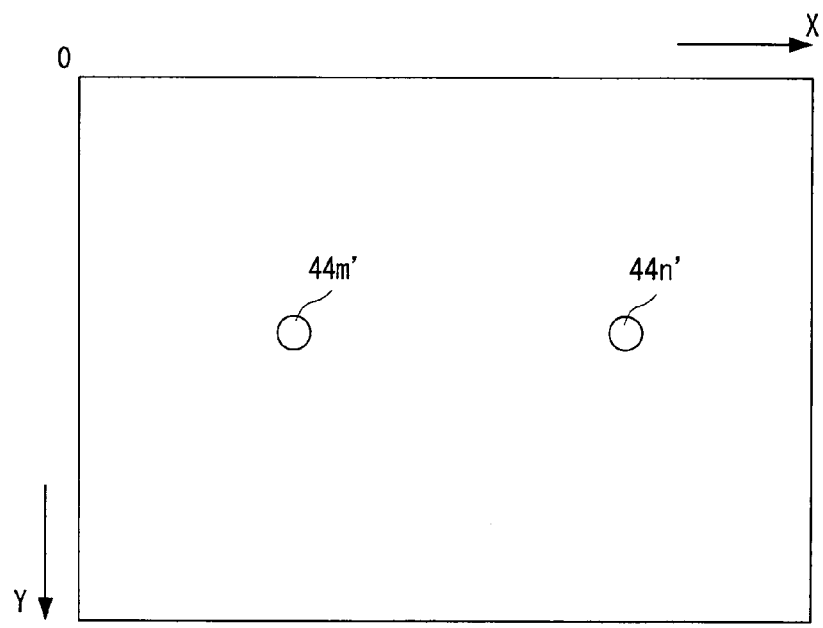
FIG. 8 is an illustrative view showing one example of an imaged image including object images.

If the first controller 34 is held within the operable range, an image of each of the markers 44m and 44n is imaged by the imaged information arithmetic section 88. That is, the imaged image obtained by the imager 104 includes an image (object image) of each of the markers 44m and 44n as an object to be imaged. FIG. 8 is a view showing one example of the imaged image including an object image. The image processing circuit 106 calculates coordinates (marker coordinates) indicative of the position of each of the markers 44m and 44n in the imaged image by utilizing the image data of the imaged image including the object images 44m' and 44n'.

Since the object images 44m' and 44n' appear as a high-intensity part in the image data of the imaged image, the image processing circuit 106 first detects the high-intensity part as a candidate of the object image. Next, the image processing circuit 106 determines whether or not the high-intensity part is an object image on the basis of the size of the detected high-intensity part. The imaged image may include images other than the object image due to sunlight through a window and light of a fluorescent lamp in the room as well as the two object images 44m' and 44n'(marker images). The determination processing whether or not the high-intensity part is an object image is executed for discriminating the images 44m' and 44n' of the two markers 44m and 44n as an object image from the images other than them, and accurately detecting the object image. In order to discriminate the object images 44m' and 44n'in the imaged image from other images, the imaging objects 44m and 44n are necessary to be known, and in this embodiment, the size is decided in advance, and therefore, it is possible to estimate the size of the marker images 44m' and 44n'. Thus, on the basis of the size of the high-intensity part, it is possible to make a determination of the marker images 44m' and 44n'. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 106 calculates the position of the high-intensity part. More specifically, the barycenter position of the high-intensity part is calculated. Here, the coordinates of the barycenter position is called a "marker coordinates". Also, the barycenter position can be calculated with more detailed scale than the resolution of the imager 104. Now, the resolution of the imaged image imaged by the imager 104 shall be 126×96, and the barycenter position shall be calculated with the scale of 1024×768. That is, the marker coordinates is represented by the integer from (0, 0) to (1024, 768).

Additionally, as shown in FIG. 8, the positions in the imaged image are represented in a coordinate system (X-Y coordinate system of the imaged image) by taking the upper left of the imaged image as an original point O, the downward direction as the Y-axis positive direction, and the right direction as the X-axis positive direction.

Furthermore, in a case that the object images 44m' and 44n' are accurately detected, two high-intensity parts are determined as an object image by the determination processing, and therefore, it is possible to calculate two marker coordinates. The image processing circuit 106 outputs data indicative of the calculated two marker coordinates, that is, imaging object data indicative of positions of the imaging objects to the communication unit 98. The output imaging object data (marker coordinate data) is included in the controller data by the micon 108 as described above, and transmitted to the game apparatus 12.

When taking in the marker coordinate data from the received controller data, the game apparatus 12 (CPU 46) can calculate instruction positions (instruction coordinates) of the first controller 34 on the screen of the monitor 30 and the distance from the first controller 34 to each of the markers 44m and 44n on the basis of the marker coordinate data. For example, when the first controller 34 instructs the left end of the monitor 30, the object images 44m' and 44n' are detected at the right of the imaged image, and when the first controller 34 instructs the lower end of the screen, the object images 44m' and 44n' are detected at the upper portion of the imaged image. In other words, the marker coordinates on the imaged image are detected at positions in reverse to the instruction positions of the first controller 34 on the screen. Accordingly, when the coordinates of the instruction positions of the first controller 34 are calculated from the marker coordinates, the coordinate system is appropriately transformed from the coordinate system of the imaged image in FIG. 8 to a coordinate system for representing positions on the screen.

Additionally, in this embodiment, in the first controller 34, predetermined arithmetic processing is performed on the imaged data to detect the marker coordinates, and the marker coordinate data is transmitted to the game apparatus 12. However, in another embodiment, imaged data is transmitted as controller data from the first controller 34 to the game apparatus 12, and the CPU 46 of the game apparatus 12 performs predetermined arithmetic processing on the imaged data to detect the marker coordinates and the coordinates of the instruction positions.

Furthermore, the distance between the object images in the imaged image is changed depending on the distance between the first controller 34 and each of the markers 44m and 44n. Since the distance between the markers 44m and 44n, the width of the imaged image, and the viewing angle β of the imager 104 are decided in advance, by calculating the distance between the two marker coordinates, the game apparatus 12 can calculate the current distance between the first controller 34, and each of the markers 44m and 44n.

In the game system 10, information selection processing is executed for allowing a user to select an arbitrary item from a plurality of items, and processing the item determined to be selected. In this embodiment, a description is made in a case that the present invention is applied to a character selection in character input processing. It should be noted that the present invention can be applied to various information selection such as a game item selection, a menu selection, etc.

Figure 9:
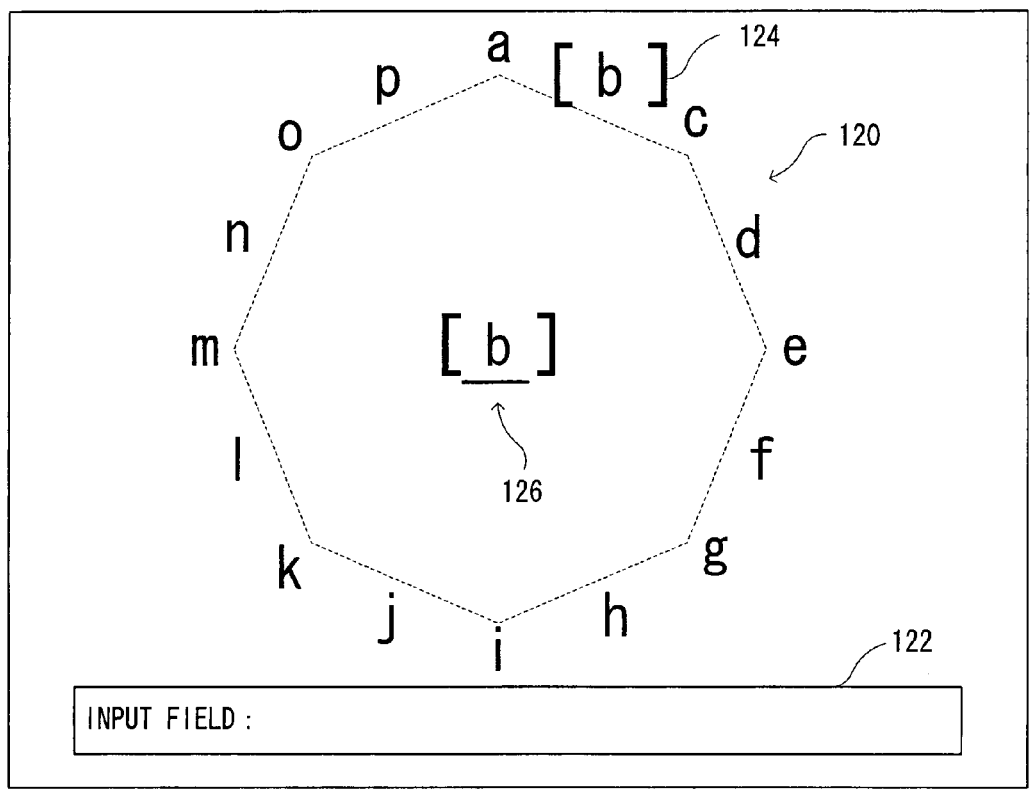
FIG. 9 is an illustrative view showing one example of a character input screen.

FIG. 9 shows one example of a character input screen to be displayed when a character input is performed. On the screen, a list 120 for selecting a character to be input and an input field 122 for displaying the input character are provided. In the list 120, a plurality of characters as selection items are arranged in a ring form. In detail, the plurality of characters may be arranged in a circle or a polygon.

In this embodiment, positions of 16 characters correspond to octagonal vertexes and midpoints of the sides. In FIG. 9, alphabetic characters a-p are arranged clockwise in turn. It should be noted that the arrangement of a-p shown in FIG. 9 is according to alphabetical order, and does not take an input frequency of each item into account.

Figure 10:
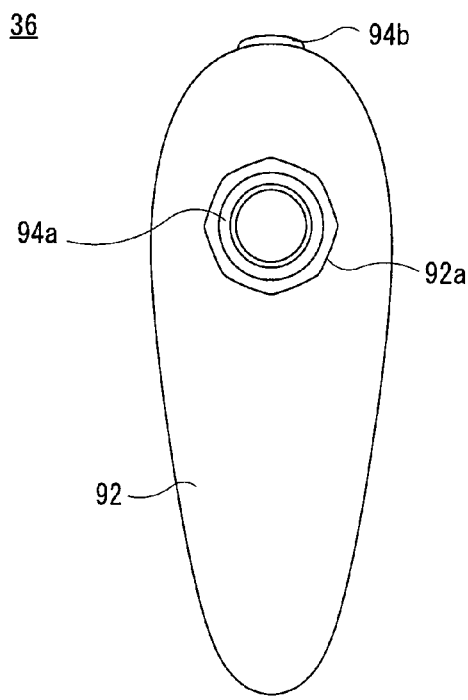
FIG. 10 is a top view of the second controller.

Selecting an item is performed by a direction instruction by means of the analog joystick 94a. Therefore, in this embodiment, the arranged shape of the selection items is determined by the shape of the guide 92a of the analog joystick 94a. As understood from FIG. 10, the octagonal guide 92a is formed in the housing 92 of the second controller 36, and the movement like an inclined direction and amount of the analog joystick 94a is restricted by the guide 92a. Especially, the analog joystick 94a is securely engaged at a position of an angle of the guide 92a with two sides of the guide 92a forming the angle, and this makes it easy for the user to input in a direction corresponding to an angle. Accordingly, the selection items in this embodiment are arranged at positions corresponding to the vertexes and the midpoints of the sides of the octagon so as to be conformed to the shape of the guide.

Furthermore, in the list 120, a cursor 124 to be moved to a position of an item in correspondence to an operation direction of the analog joystick 94a is displayed. When the analog joystick 94a is in a neutral position, that is, when it is not operated, the cursor 124 may not be displayed. Furthermore, a display field 126 indicating an item which is currently being selected is provided at the center of the list 120. The display field 126 is represented by parenthesis and an underline, for example, and in FIG. 9, since a character "b" is being selected, a character b is displayed, but if no item is selected, a blank is provided. It should be noted that in FIG. 9, for the sake of simplicity, the list 120 is shown in a larger size at the center of the screen, but the size and the position of the list 120 are arbitrary. In a case that another main image exists, the main image is displayed at the center of the screen, and the list 120 may be displayed in a smaller size at the end of the screen.

Figure 11:
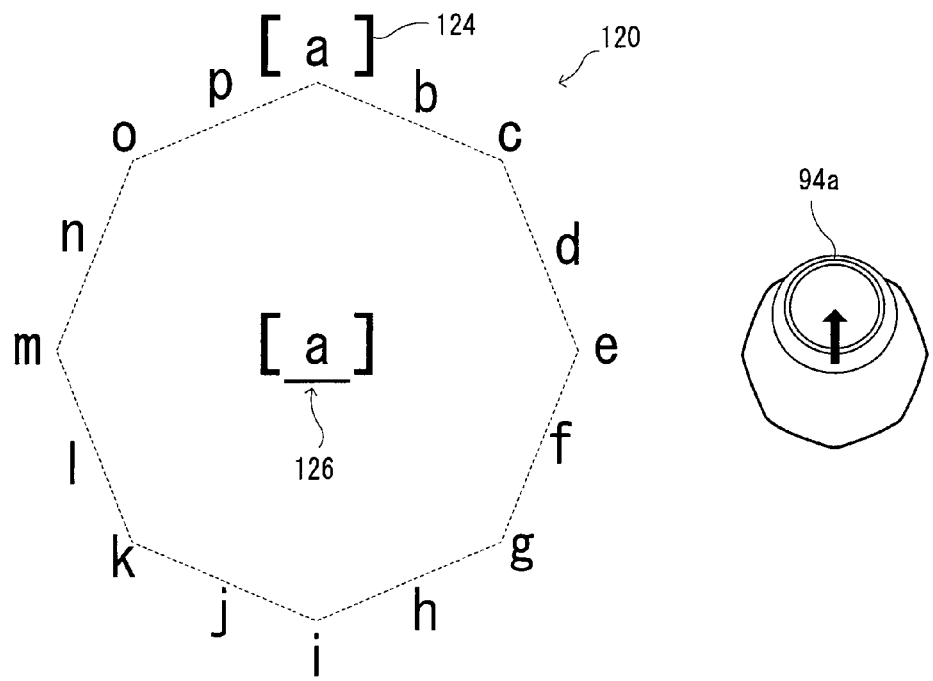
FIG. 11 is an illustrative view showing one example of a character selection by a direction instruction with an analog joystick.

When the analog joystick 94a is operated, the cursor 124 is moved to an item corresponding to an operation direction by the analog joystick 94a. For example, as shown in FIG. 11, when the analog joystick 94a is upwardly inclined, the cursor 124 is moved to a position of the character "a" corresponding to an upward direction, and the character "a" which is currently being selected is displayed in the display field 126 at the center of the list 120. Thus, in this embodiment, by a simple operation of a direction input by means of the analog joystick 94a, it is possible to select an item at a position corresponding to an input direction.

In such an item selection in correspondence with an operation direction, items are required to be assigned to directions, but there is a limit to the number of correspondences between the directions and items. If a lot of items exist like a character input, it is difficult to simultaneously make all the items candidates to be selected (selection item). In this embodiment, the items are arranged in correspondence with the vertexes and the sides of the octagon of the guide 92a, and therefore, the number of items adopted as candidates for selection at a time is equal to or less than 16. Accordingly, if items above 16 are required to be selected, only the items below the predetermined number of the items is adopted as candidates for selection, and then, the candidates for selection have to be changed. For example, features of adopting a plurality of items as candidates for selection in separate pages, and switching the pages are required. In a case of a few items to be selected, only one page may be necessary.

In order to select an item in correspondence with an input direction of the analog joystick 94a, the selection items have to be brought into correspondence with predetermined directions. Thus, in this embodiment, an area previously brought into correspondence with an input value of the analog joystick 94a is provided, and by bringing the area into correspondence with an item, the item and the input direction are corresponded. The area is called a cell.

Figure 12:
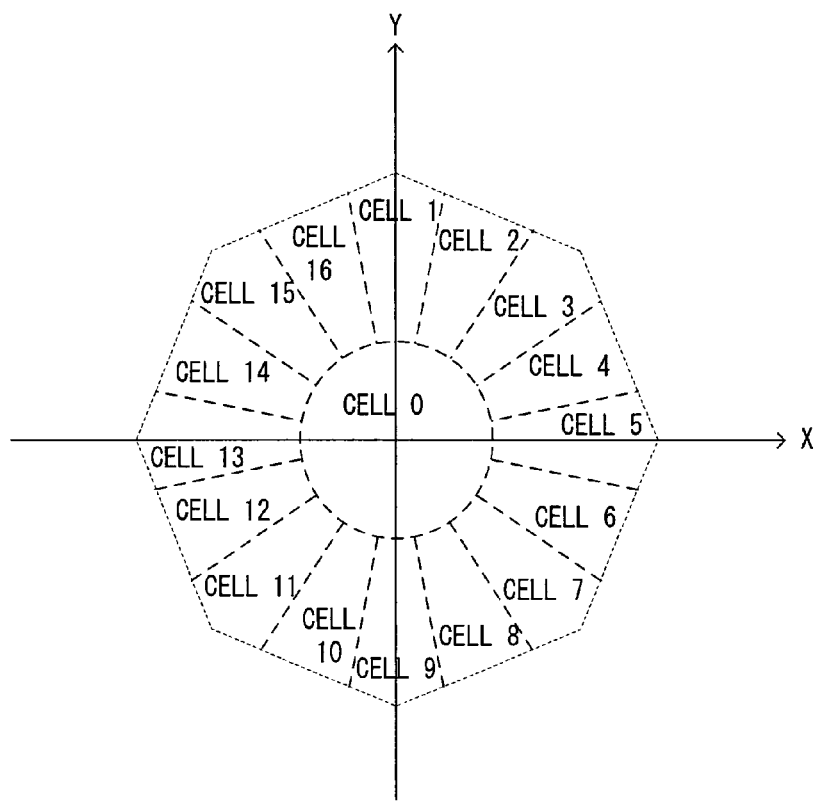
FIG. 12 is an illustrative view showing one example of an arrangement of cells.

In this embodiment, as shown in FIG. 12, within a coordinate plane by the input value of the analog joystick 94a, cells 0-16, that is, 17 areas in total including areas dividing an octagon into 16 and the area around the center of the octagon are provided. The cells 1-16 are association with the above-described selection items (the above-described a-p, etc.). It should be noted that the central cell 0 corresponds to a case that a direction input is scarcely present (the analog joystick 94a is scarcely operated), and the cell 0 is not associated with the selection items and is brought into correspondence with a no-input state.

The items to be set in the list 120 in association with the cells are selected from item data 222. FIG. 13 shows a part of the item data. The item data includes a plurality of items, and the respective items are stored as an alignment (i[1], i[2], ... ), for example. In FIG. 13 example, alphabetic characters a to z are registered in i[1] to i[26]. Blanks are set in i[27] to i[32]. Various symbols are registered in i[33] to i[48]. Items in relation to numerics are registered in i[49] to i[64]. In addition, uppercase alphabetic characters A to Z, kana, etc. may be registered. Furthermore, a predetermined character string as well as characters may be set as item data. In this embodiment, at the parts indicated by [ ] of i[65] to i[85], character strings each formed by a plurality of characters are registered as character string data at the lower line in FIG. 13. By registering as an item heavy used character strings such as a part of a domain name, an address, and the like, it is possible to input a character string with one input, capable of improving efficiency of the character input.

Figures 14, 15:
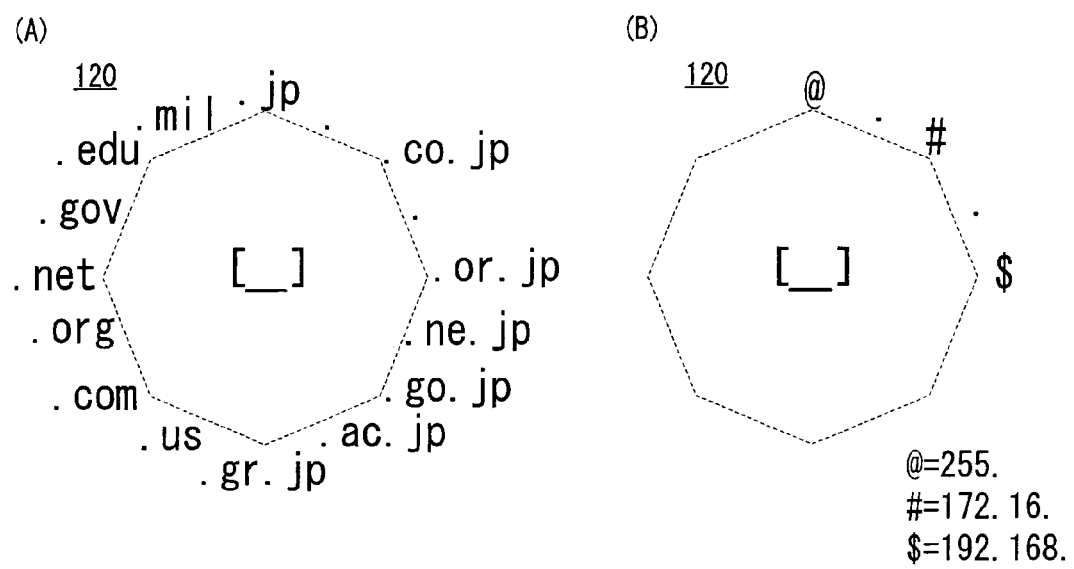
FIG. 14 is an illustrative view showing a selection item list including a character string.
FIG. 15 is an illustrative view showing selection item list data indicating correspondences between cells and items.

FIG. 14 (A) shows an list 120 when the character strings of i[65]-i[80] are adopted as a selection item, and FIG. 14 (B) shows a list 120 when the character string of i[81]-i[85] are adopted as a selection item. The character string may be shown on the list 120 as it is as shown in FIG. 14 (A). Also, as shown in FIG. 14 (B), a character string formed by a plurality of numerics may be replaced with a symbol for the sake of display. By displaying a character string corresponding to the symbol separately, it is possible to prevent the display from being complicated. By thus registering a standard combination with a high input frequency like a part of the address, a domain name, as an item, it is possible to develop efficiency of a character input.

In a case of setting a selection item, the predetermined number of the items is selected from the item data so as to be corresponded with the cells 1-16. As shown in FIG. 15, selection item list data indicative of a correspondence between a cell ID indicating identification information of a cell and an item ID (for the purpose of discrimination, the ID indicative of i[1], i[2], ... are represented as i1, i2, ... ) indicative of identification information of an item is generated. In a case of the list 120 shown in FIG. 9, the alphabetic characters a-p (character ID:i1-i16) are set to the cells 1-16 (cell ID:c1-c16) as a selection item. As described above, a plurality of items are required to be divided into a plurality of pages. In a case of the item data shown in FIG. 13, it may be possible that the items i1-i16 (alphabetic characters a-p) are assigned to the first page, the items i17-i32 (alphabetic characters q-z) are assigned to the second page, the items i33-i48 (various symbols) are assigned to the third page, the items i49-i64 (numerics) are assigned to the fourth page, the items i65-i80 (domain name) are assigned to the fifth page, and the items i81-i96 (address related-numerics) are assigned to the sixth page.

When deciding an assignment of an item to a direction (arrangement of an item), an input difficulty level of the direction and an input frequency with respect to the item are considered in this embodiment.

Figure 16:
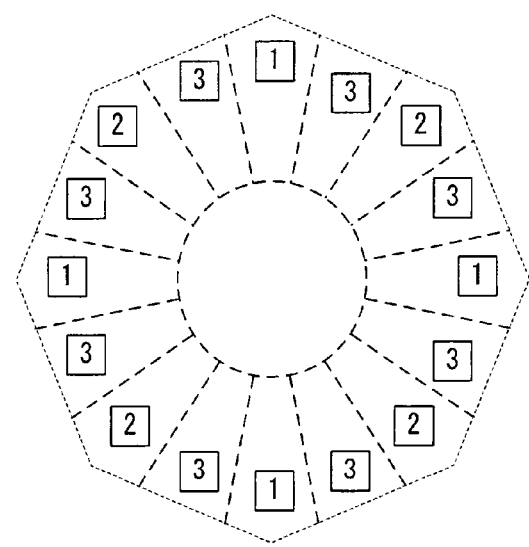
FIG. 16 is an illustrative view showing input difficulty level data of the cells.

The plurality of cells 1-16 are arranged so as to be conformed to the shape of the guide 92a of the analog joystick 94a as described above, and are respectively brought into correspondence with predetermined directions. The degree of difficulty of a direction input operation with the analog joystick 94a is different depending on the direction, that is, there is a difference among cells in the difficulty of inputting it. FIG. 16 shows one example of input difficulty level data. As in this embodiment, in a case that the analog joystick 94a with the octagon guide 92a is used, and the cells are arranged so as to be divided into 16, four directions including the left, right, top and bottom directions are the easiest to input. This is because that the stick 94a is engaged by a vertex of the guide 92a, and an inclining operation of the stick 94a is typically performed with the thumb (see FIG. 6). The input difficulty level of the four directions including the left, right, top and bottom are the lowest, and set to 1. The oblique four directions corresponding to the vertexes of the guide 92a is next easier to input. The input difficulty level of these oblique four directions are set to 2. Then, the rest of the eight directions corresponding to the parts except for the vertexes of the guide 92a are the hardest to input. The input difficulty levels of these eight directions are the highest, and set to 3. The input difficulty level data indicative of an input difficulty level di of each cell is stored in advance.

Furthermore, the item data includes a plurality of items, but some items are often input, but other items are scarcely input. That is, a frequency with which each of the items is input is different. Therefore, input frequency data indicative of an input frequency fi with respect to each item shown in FIG. 17 is stored. In a case that statistical information of an input frequency for each item has already been known, it may be stored in advance as input frequency data. Additionally, in an actual character input processing in the information selecting apparatus 10, by obtaining the statistical information of the input frequency of the item input by the user, the input frequency data may be updated.

In this embodiment, in an initial state of the list 120, the selection item is arranged on the basis of input frequencies. A fixed arrangement determined on the basis of the statistical information of the known input frequencies, that is, a static arrangement based on the input frequencies is realized.

For example, if items to be put on each page are fixedly determined, the arrangement of the items in an initial state can be determined in advance on the basis of the known input frequencies, and therefore, initial arrangement information of each page on which a static arrangement based on the input frequencies is performed is stored in advance, and on the basis of the initial arrangement information, the selection item can be set. It should be noted that in setting the selection item without utilizing the initial arrangement information stored in advance, the arrangement of each item may be decided with reference to the input frequency data.

FIG. 18 shows one example of a static arrangement in which items with a high input frequency are arranged at an easy-to-input direction. More specifically, in FIG. 18 (A), high-frequency items are arranged at the vertexes of the guide 92a. By assigning the items with a high input frequency to the directions corresponding to the vertexes with a low input difficulty level, it is possible to make an input of the high-frequency items easy. Furthermore, in FIG. 18 (B), the high-frequency items are arranged at the four vertexes including the left, right, top and bottom directions of the guide 92a. In this case, by assigning the items with a high input frequency to the directions corresponding to the vertexes with an especially low input difficulty level, it is possible to make an input of the high-frequency items easier.

Figure 19:
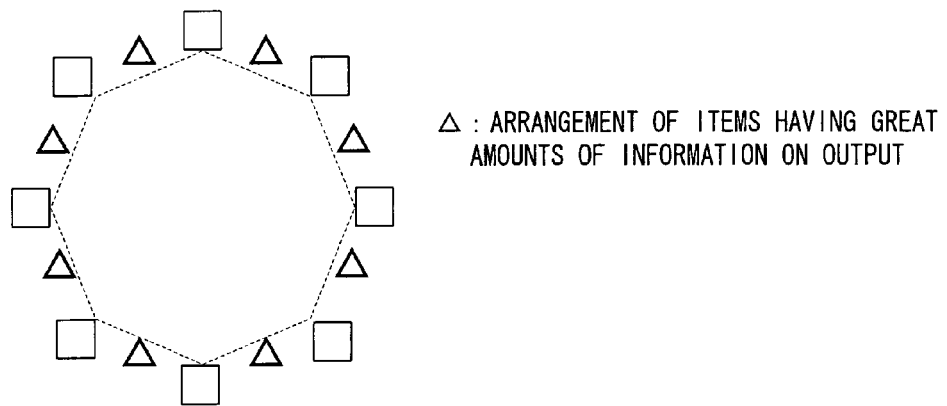
FIG. 19 is an illustrative view showing one example of an arrangement of items having greater information amounts on output.

FIG. 19 shows another example of a static arrangement. In FIG. 19, an item having great amounts of information on output like a fixed phrase is assigned to a hard-to-input direction. The fixed phrase has great amounts of information to be included. Accordingly, if a fixed phrase is registered in advance as an item, it is possible to expect to develop efficiency of the character input. On one hand, an input frequency of the fixed phrase is often not so higher than that of a single character. Therefore, an item having great amounts of information like a fixed phrase is assigned to a direction corresponding to a part except for a vertex of the guide 92$a$. Even if an item having great amounts of information is assigned to a hard-to-input direction, it has great amounts of information amount on output, and therefore, it is possible to efficiently perform a character input as a whole.

Furthermore, the arrangement of the selection item is movably rearranged on the basis of an input frequency. More specifically, a direction input acceptable angle is movably changed so as to be directly proportional to an input frequency.

Figure 20:
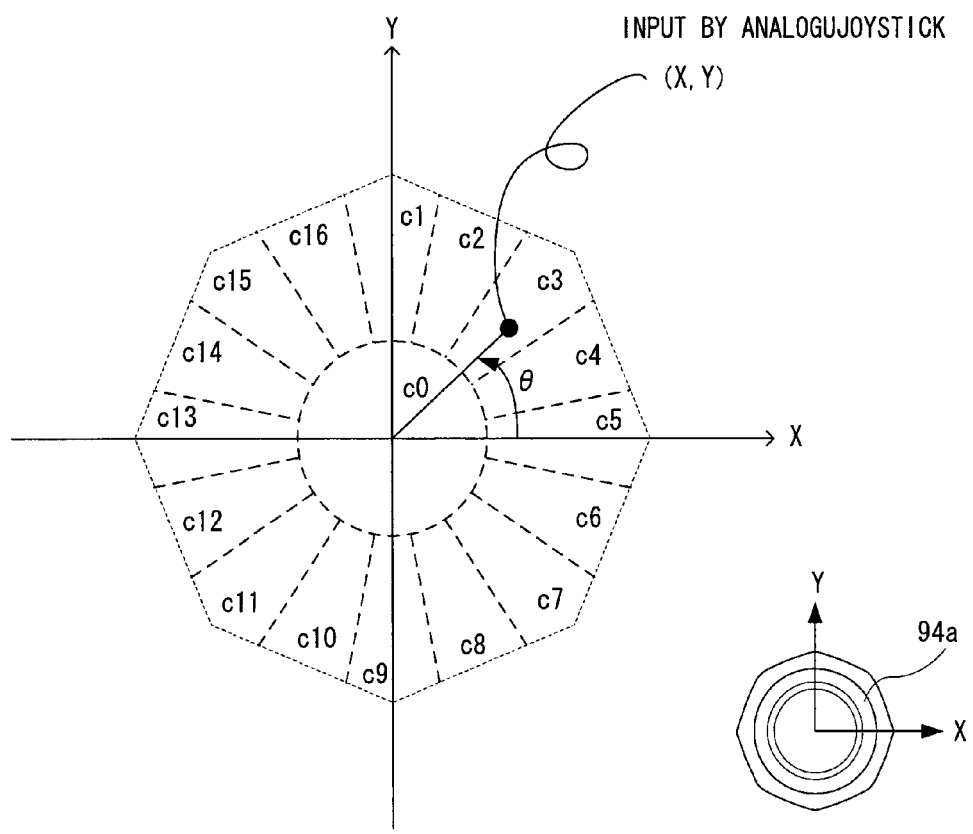
FIG. 20 is an illustrative view showing one example of an acceptable range of a cell with respect to an input by an analog joystick.

In this embodiment, an item to be input by a user is instructed by a direction to which the analog joystick 94$a$ is inclined. Thus, for the purpose of specifying an item, an input direction by the user is detected on the basis of an input (operation signal) by the analog joystick 94$a$, and a cell corresponding to the input direction is specified. As shown in FIG. 20, an input direction acceptable range of the analog joystick 94$a$ is set to each of the cells (cell ID:c1-c16). Thus, by specifying an acceptable range in which the input direction is included, it is possible to specify a cell. More specifically, as shown in FIG. 20, when the horizontal direction of analog joystick 94$a$ is defined as an X axis, and the vertical direction thereof is defined as a Y axis, an inclination amount (X, Y) of the X direction and the Y direction of the analog joystick 94$a$ is included in controller data. Additionally, an input at a time of a neutral position (no inclination) is (0, 0). When the input (X, Y) of the analog joystick 94$a$ is plotted in the X-Y plane, an angle θ formed by a line connecting (0, 0) and (X, Y) and a reference direction (X axis, for example) is an inclination direction of the analog joystick 94$a$, that is, an input direction of the user. An operation signal (X, Y) of the analog joystick 94$a$ corresponds to direction data indicating a direction in correspondence with an input operation. By specifying an acceptable angle range including the angle θ calculated by the input (X, Y) by means of the analog joystick 94$a$, it is possible to specify a cell corresponding to the input direction by the user. Additionally, in a case that a magnitude of an input (X, Y) by the analog joystick 94$a$ is below a threshold value, it is considered that a direction input operation is not performed, and the cell 0 is selected. According to the above described processing, it is possible to specify in which 17 cells an input by the analog joystick 94$a$ is included. It should be noted that in the above-described processing, the angle θ is calculated from the input (X, Y) by the analog joystick 94$a$, and on the basis of which range the calculated θ belongs to, a cell corresponding to the input direction by the user is specified, but the cell may be specified by processing other than this processing. For example, without calculating the angle θ, an area of each cell is defined in the X-Y plane in FIG. 20, and on the basis of which range an input (X, Y) by the analog joystick 94$a$ is included in, a cell corresponding to the input direction by the user may be specified.

Thus, a direction input acceptable range is movably changed on the basis of an input frequency. FIG. 21 shows an acceptable angle assigning method on the basis of an input difficulty level and an input frequency. With respect to the item i, where an input difficulty level, an input frequency, a reference angle, a start angle, and an end angle are respectively $d_i$, $f_i$, $θ_i$, $φ_i$, and $φ_{i+1}$, a conditional expression of the arrangement is represented by the following Equation 1.

$$(φ_{i+1}-θ_i)/(θ_{i+1}-φ_{i+1})=d_i*f_i/(d_{i+1}*f_{i+1}) \quad \text{[Equation 1]}$$

Here, the reference angle $θ_i$ is a reference angle of an acceptable range of the cell with which the item i is brought into correspondence, and is an angle corresponding to an octagonal vertex or a midpoint of a side in this embodiment. The start angle $φ_i$ corresponds to a starting position of the acceptable range, and the end angle $φ_{i+1}$ corresponds to an ending position of the acceptable range.

A following boundary condition is applied to Equation 1. Equation 2 is applied as a condition of a fixed end, and Equation 3 is applied as a condition of a free end.

$$θ_i = \text{constant} \quad \text{[Equation 2]}$$

$$φ_{i+1}-θ_i = θ_i - φ_i \quad \text{[Equation 3]}$$

It should be noted that in a case that all are a free end, $θ_0=0$.

By solving the above-described simultaneous linear equation, the range of the acceptable angle ($φ_i$ to $φ_{i+1}$) is calculated. Then, cell angle data indicative of an acceptable angle range of each cell as shown in FIG. 22 is generated. By specifying an acceptable angle range in which an input direction of the analog joystick 94$a$ is included with reference to the cell angle data, it is possible to specify a cell corresponding to the input direction by the user. Thus, an acceptable range depending on an input frequency can be set, capable of making an input of the high-frequency item easy.

Furthermore, as another method of movably rearranging a selection item, an arrangement of items is changed on the basis of the input difficulty level and the input frequency. Where an input difficulty level is $d_i$, and an input frequency is $f_i$ with respect to an item i, a total sum of the product of the input difficulty level and the input frequency is made an evaluation function to try to minimize the evaluation function $\Sigma(d_i*f_i)$. At this time, the order of arbitrary items is subjected to a constraint before and after, that is, the arrangement of alphabetic characters, numerics, etc. may be subjected to a constraint on the order. More specifically, when an item is input, the arrangement of the items is reviewed while the constrained condition is satisfied, and whereby, minimization of the evaluation function can be insured. The review of the arrangement is performed at a position being in the vicinity of the input item, and having a difficulty level lower than that of the item in the current position.

Figure 23:
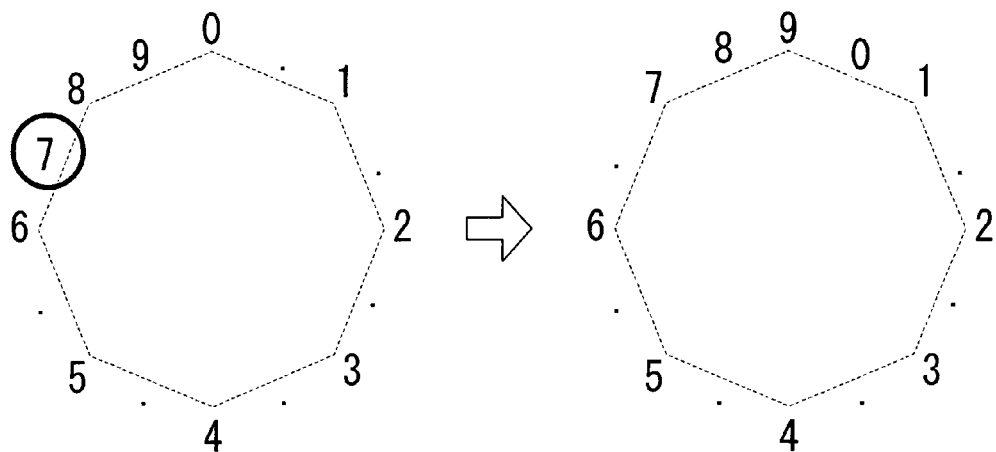
FIG. 23 is an illustrative view showing one example of a change of an arrangement of the items on the basis of an input difficulty level and a input frequency.
Figure 24:
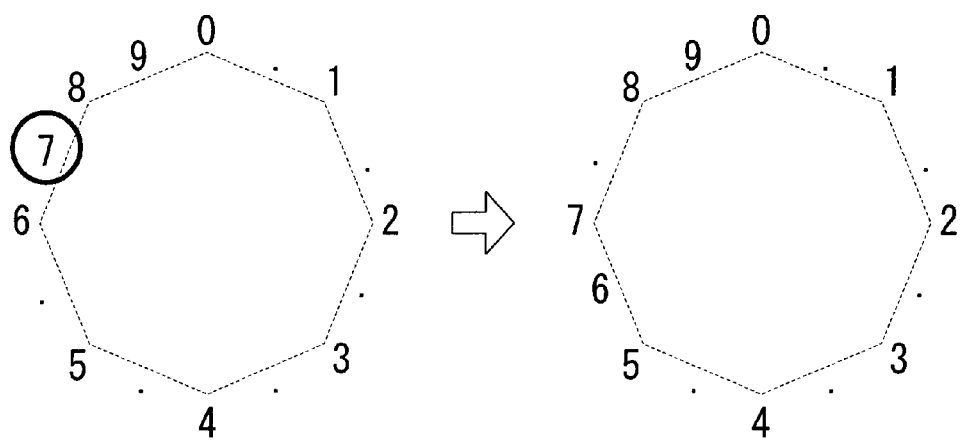
FIG. 24 is an illustrative view showing another example of a change of an arrangement of the items on the basis of an input difficulty level and a input frequency.

With reference to FIG. 23 and FIG. 24, an arrangement changing method is described. An initial arrangement of the selection item is as shown in FIG. 23 and FIG. 24, and in cells 1-12, numerics 0-5 are arranged in order so as to alternate with a period, and the rest of the numerics 6-9 are arranged in order in cells 13-16. That is, in a case that the numerics 0-9 are arranged, several parts are left, and therefore, the periods are arranged at the several parts of the side of the octagon. In addition to the period, symbols, etc. may be arranged as required. The arrangement of the respective numerics is subjected to a constraint on the order, and the numerics and the period do are not subjected to a constraint.

In changing the arrangement, with respect to an input item X, a cell which has a difficulty level lower than that of a current cell A, and is immediate neighbor of the current cell A are searched clockwise and counterclockwise. For example, in a case that the input item X is a numeric 7 of the cell 14, the input difficulty level of the cell 14 is 3. FIG. 23 shows a case of a clockwise search, and FIG. 24 shows a case of a counterclockwise search. By the clockwise search in FIG. 23, the cell 15 (input difficulty level 2) is found as a cell B having a difficulty level lower than that of the current cell A and being immediate neighbor of the current cell A. Next, it is determined whether or not an item having a constrained relationship with the item X is present between the cells AB. If an item having a constrained relationship is not present, the arrangement of the item X and the cell B are changed in position. However, in FIG. 23 example, there is the numeric 8 having a constrained relationship with the numeric 7 is present between the cells AB, and therefore, an item having no constrained relationship is rearranged. More specifically, an item which does not have a constrained relationship with the item X is arranged by equal number of the cells between A and B from the cell A in order. Thus, a period is arranged in the cell 14. Then, a rearrangement of the item X is performed. That is, the item X is arranged in the cell B having a low difficulty level and being immediate neighbor. Thus, the numeric 7 is arranged in the cell 15. In addition, an item having a constrained relationship is rearranged. That is, an item having a constrained relationship with the item X is arranged subsequently to the cell B in order. The numerics 8, 9, 0 having a constrained relationship with the numeric 7 were clockwise arranged from the cell 15 in which the numeric 7 is rearranged to the cell 1, and therefore, these numerics 8-0 are rearranged from the cell 16 to the cell 2 in order. Furthermore, the rest of the items are rearranged as it is. Thus, by the clockwise search, a new arrangement shown in FIG. 23 can be obtained.

On the other hand, in a case of a counterclockwise search shown in FIG. 24, a cell 13 (input difficulty level 1) is found as a cell B having a difficulty level lower than that of the current cell A and being immediate neighbor of the current cell A. Next, it is determined whether or not an item having a constrained relationship with the item X is present between the cells AB. An item having a constrained relationship with the item is present between the A and B, and therefore, an item not having a constrained relationship is rearranged to thereby arrange a period in the cell 14. Succeedingly, by rearranging the item X, the numeric 7 is arranged in the cell 13. In addition, by rearranging the item having a constrained relationship, the numeric 6 is rearranged in the cell 12 subsequently to the cell B. Furthermore, the rest of the items are rearranged as it is. Thus, by the counterclockwise search, a new arrangement shown in FIG. 24 can be obtained.

Then, with respect to the new arrangement, an evaluation function (a total sum of a product of the input difficulty level and the input frequency) is calculated to determine whether or not the evaluation function becomes much smaller. If an evaluation function is much smaller, a change to the new arrangement is adopted. If an evaluation function does not become much smaller, the arrangement is returned to the preceding one.

Figure 25:
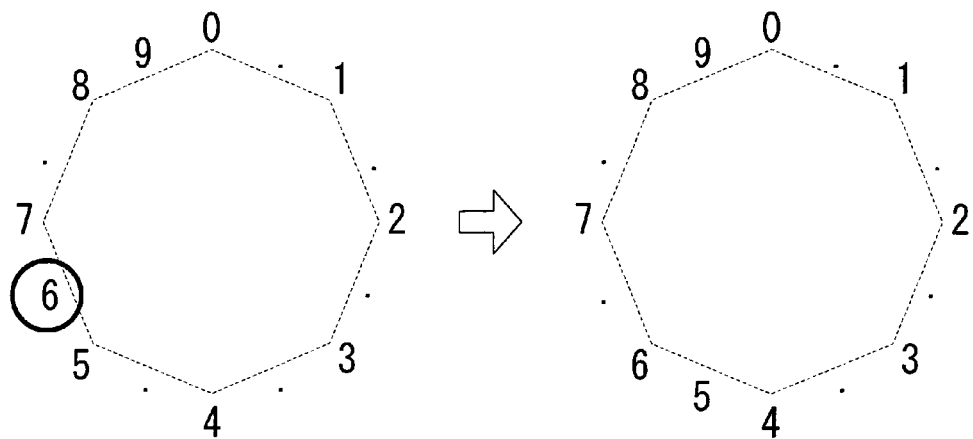
FIG. 25 is an illustrative view showing the other example of a change of an arrangement of the items on the basis of an input difficulty level and an input frequency.

After the new arrangement is adopted, similar arrangement changing processing is executed in response to an input of the item in the new arrangement. FIG. 25 shows a process of a change of the arrangement in response to an item input after a new arrangement shown in FIG. 24 is adopted. Here, a description is made only on the case of the counterclockwise search. For example, in a case that the input item X is the numeric 6 in the cell 12, the input difficulty level of the cell 12 is 3. A cell B having a difficulty level lower than that of the current cell A and being immediate neighbor of the current cell A is searched, and whereby, the cell 11 having the input difficulty level 2 is found. An item having a constrained relationship with the item X is present between the cells AB, and therefore, by rearranging the item not having a constrained relationship, a period is arranged in the cell A as an item not having a constrained relationship with the numeric 6. Succeedingly, by a rearrangement of the input item X, the numeric 6 is arranged in the cell B. In addition, by rearranging the item having a constrained relationship, the numeric 5 having a constrained relationship is arranged in the cell 10 subsequently to the cell B. Furthermore, the rest of the items are rearranged as it is. Thus, a new arrangement shown in FIG. 25 can be obtained. If an evaluation function of the new arrangement becomes much smaller, the arrangement of the selection item is changed to the new arrangement.

Figures 26, 27:
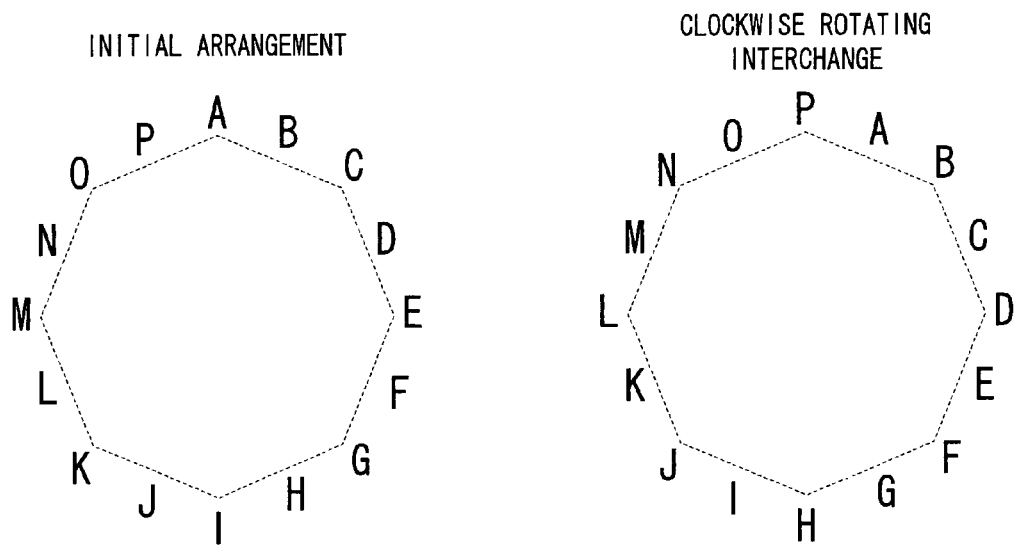
FIG. 26 is an illustrative view showing one example of an interchanged arrangement of items.
FIG. 27 is an illustrative view showing temporary rearrangement data.

As another arrangement changing method of the selection item, a temporary rearrangement in response to an operation by the user is also executed. In this embodiment, items assigned to the directions corresponding to the vertexes of the guide 92a and items assigned to the directions corresponding to the parts except for the vertexes are interchanged. FIG. 26 shows one example of an interchanged arrangement as a temporary rearrangement. In FIG. 26, uppercase alphabetic characters A-P are arranged in cells 1-16 in order as an initial arrangement. When a clockwise interchanging operation is performed by the user, the selection item is clockwise rotated and interchanged. That is, the arrangement of the respective items is clockwise displaced 360/16 degrees, and the respective items are moved to the cells to their immediate right. Although the illustration is omitted, when a counterclockwise interchanging operation is performed, the selection item is rotated counterclockwise to move the respective items to the cells to their immediate left.

It should be noted that the clockwise interchanging operation is an operation of the +button 82g existing on the right side of the menu button 82f, and the counterclockwise interchanging operation is an operation of the −button 82e existing on the left side of the menu button 82f, for example. In a case that the controller 14 is formed so as to be held with both hands, an interchanging operation may be assigned to the L button switch and the R button in place of the −button 82e and +button 82f.

The interchanged arrangement is a temporary arrangement until an input of the item is determined. The temporary rearrangement data shown in FIG. 27 is generated for specifying an item instructed by a direction input in the temporary arrangement. With respect to the temporary rearrangement data, each cell and an item arranged in the cell are corresponded similarly to the selection item list data.

By such an interchanged arrangement, the items can be interchanged between the vertexes of the guide 92a and the parts except for the vertexes, and therefore, it is possible to temporarily allot the items assigned to hard-to-input directions to easy-to-input direction. Thus, it is possible to easily perform an item selection.

Figure 28:
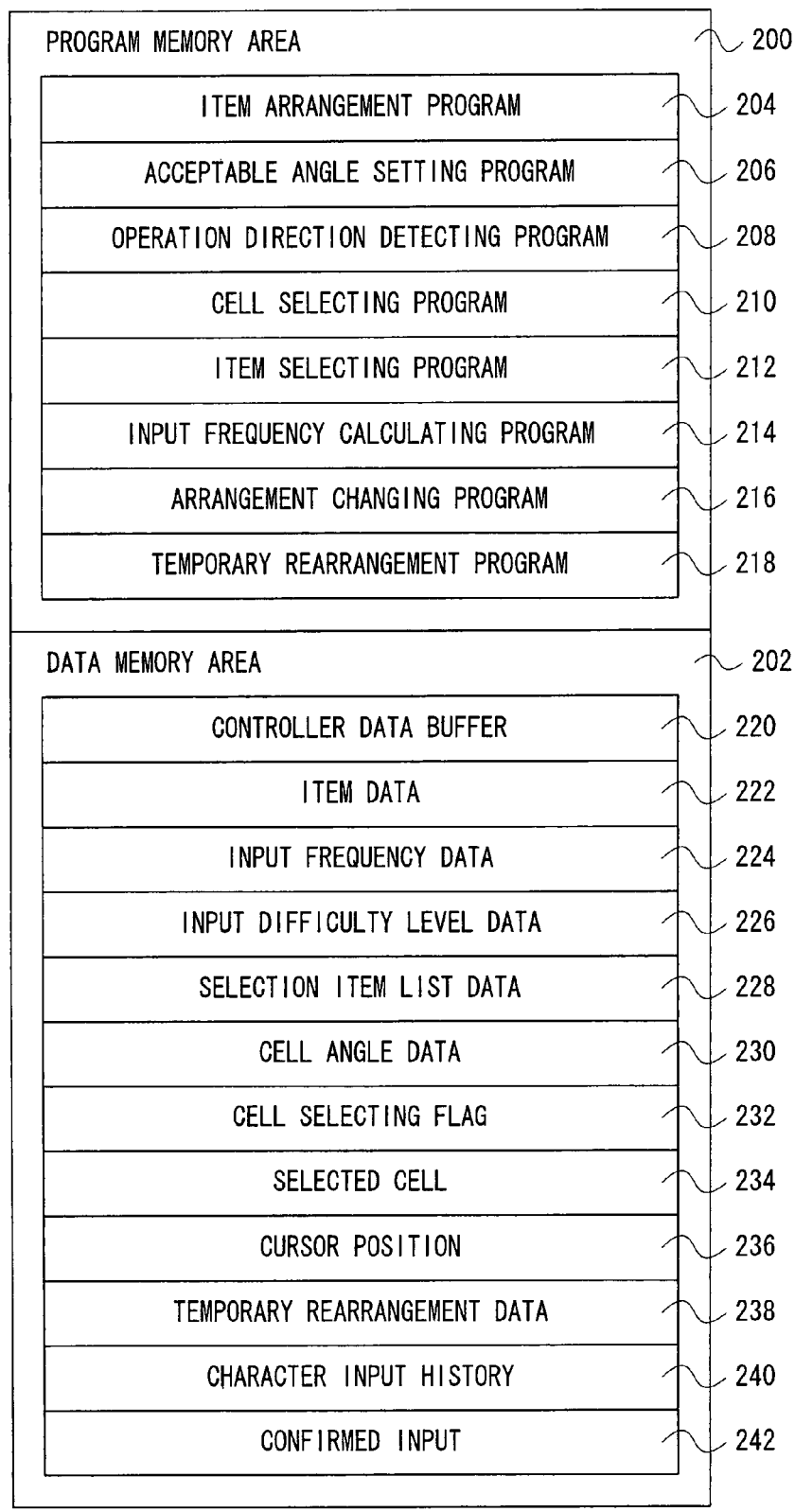
FIG. 28 is an illustrative view showing one example of a memory map.

FIG. 28 shows one example of a memory map. The memory map includes a program memory area 200 and a data memory area 202. A part of the program and the data are read from the optical disk 22 entirely at a time, or partially and sequentially as necessary so as to be stored into the main memory 50. It should be noted that FIG. 28 shows a part of the memory map, which also stores other programs and data necessary for the processing. For example, sound data for outputting a sound like a voice, a sound effect, music, etc., image data for generating a screen, a sound outputting program, an image generation displaying program, etc. are read from the optical disk 22, and stored in the data memory area 202 or the program memory area 200. Additionally, in this embodiment, a part of the program and the data are read from the optical disk 22, but in another embodiment, a nonvolatile storage medium like a flash memory, etc. may be integrated in the game apparatus 12, and the program and data stored in advance in the storage medium may be read so as to be stored in the main memory 50. At this time, a wireless or wire communication module may be provided to the game apparatus 12 to store a program downloaded via a network in the storage medium.

In a memory area 204 of the program memory area 200, an item arrangement program is stored. The program is a program for setting selection items from a plurality of items. In this embodiment, items equal to or less than a predetermined number (16 pieces) are read from the item data, and each of the items is assigned to a direction by being into correspondence with a cell on the basis of an input frequency. For example, in a case of the static arrangement based on an input frequency, as shown in FIG. 18 (A), the high-frequency items are arranged at the cells corresponding to the vertexes of the guide 92a, that is, assigned to the directions of the cells. Alternatively, as shown in FIG. 18 (B), the high-frequency items are assigned to the cells corresponding to the predetermined four (left, right, top, and bottom) vertexes of the guide 92a, that is, directions of the cells. Furthermore, as shown in FIG. 19, the items having greatest amounts of information on output like a fixed phrase are arranged at cells corresponding to the parts except for the vertexes of the guide 92a.

In a memory area 206, an acceptable angle setting program is stored. The program is a program for setting a cell acceptable angle on the basis of an input difficulty level and an input frequency of an item. Each cell acceptable angle range is calculated from the arrangement condition equation (Equation 1) and the boundary condition (Equations 2 and 3) as shown in FIG. 21, and the cell angle data as shown in FIG. 22 is generated. Each time that an arrangement of an item is changed, or each time that an input frequency is updated, a cell acceptable angle range is movably changed. This makes it possible to relatively make the range of the direction accepting a high-frequency item larger than that of other items. Thus, it becomes possible to makes it easy to select an item heavy-used by the user.

In a memory area 208, an operation direction detecting program is stored. The program is a program for detecting an operation direction (input direction) by the user. As shown in FIG. 20, by an operation signal (X, Y) of the analog joystick 94a, it is possible to obtain a direction θ corresponding to an input operation by the user.

In a memory area 210, a cell selecting program is stored. The program is a program for selecting a cell corresponding to an input direction by the user. Each cell is assigned an input direction acceptable range of the analog joystick 94a, and is stored with cell angle data indicative of an acceptable angle range of each cell as shown in FIG. 22. By specifying an acceptable angle range including an input direction on the basis of the cell angle data, it is possible to specify a cell corresponding to the input direction. Additionally, in a case that the magnitude of the input (X, Y) by the analog joystick 94a is below a threshold value, it is considered that a direction input operation is not performed, and the cell 0 is selected.

In a memory area 212, an item selecting program is stored. The program is a program for selecting an item corresponding to the input direction by the user. According to the above-described cell selecting program, the cell corresponding to the input direction is specified, and therefore, an item corresponding to the cell is specified in reference to the selection item list data shown in FIG. 15. In a case that a temporary rearrangement is performed, the temporary rearrangement data shown in FIG. 27 is generated, and with reference to the temporary rearrangement data, an item is specified. Furthermore, in this embodiment, by execution of a predetermined operation with the first controller 34, an input of the item which is being selected by the direction input is determined. Thus, when predetermined operation data is input, the item which is being selected is specified and output.

In a memory area 214, an input frequency calculating program is stored. The program movably calculates an input frequency of the item whose input is determined by the user, and updates input frequency data as shown in FIG. 17. Thus, it is possible to obtain an actual input frequency of the user, and change the arrangement of the items (assignment to the directions) by utilizing the input frequency. As a value of the input frequency, a ratio of the number of inputs with respect to the item to the total number of inputs, etc. is calculated, for example.

In a memory area 216, an arrangement changing program is stored. The program is a program for executing a movable rearrangement on the basis of the input frequency explained by means of FIG. 23-FIG. 25. The arrangement of items is reviewed so as to be rearranged at a near position on the basis of the input difficulty level while the order of the items is subjected to a constraint before and after. A total sum of the product of the input difficulty level and the input frequency is made an evaluation function to try to minimize the evaluation function. The change of the arrangement can be made by means of the input frequency calculated by the input frequency calculating program, and therefore, it is possible to change the arrangement on the basis of the actual selection result by the user, and assign a high-frequency item to a direction corresponding to the vertex of the guide 92a. Thus, it is possible to assign an item heavy-used by the user to an easy-to-input direction.

In a memory area 218, a temporary rearrangement program is stored. The program executes a temporary rearrangement of the items. In response to a predetermined operation by the user, an interchanged arrangement shown in FIG. 26 is executed to assign the items assigned to the directions corresponding to the vertexes of the guide 92a to the directions corresponding to the parts except for the vertexes, and assign the items assigned to the directions corresponding to the parts except for the vertexes to the directions corresponding to the vertexes. It should be noted that the predetermined operation for a temporary rearrangement is set to an operation different from the predetermined operation for determining an item selection. If the temporary rearrangement is executed, temporary rearrangement data indicative of a correspondence between the cells and the items after the rearrangement as shown in FIG. 27 is generated.

A memory area 220 of the data memory area 202 is a controller data buffer, and stores controller data received via the Bluetooth communication unit 76 from the controller 14. In a memory area 222, item data indicative of a plurality of items shown in FIG. 13 are stored. The item data is stored in advance in the optical disk 22.

In a memory area 224, input frequency data indicative of statistical information of an input frequency of each item as shown in FIG. 17 is stored. As the initial input frequency data, data based on the known statistical result may be stored in the optical disk 22 so as to be read. Furthermore, in a case that only the movable input frequency by the user is utilized without utilizing the known data, a predetermined initial value may be set by reading a predetermined value from the optical disk 22, or calculating a predetermined value the processing of the program. When an input frequency is calculated by the input frequency calculating program, the input frequency data is updated. The updated input frequency data may be stored in a nonvolatile memory (flash memory, for example) of the main memory 50 of the game apparatus 12, or the external memory card 26. In this case, input frequency data on which the result of the past input by the user is reflected is read onto the memory area 224 and utilized in next character input processing.

In a memory area 226, input difficulty level data indicative of an input difficulty level of each cell shown in FIG. 16 is stored. The input difficulty level data is stored in the optical disk 22 in advance.

In a memory area 228, selection item list data as shown in FIG. 15 is stored. The selection item list data is generated by an item arrangement program, and updated by the change according to the arrangement changing program. By referring to the selection item list data, an item corresponding to an input direction, that is, an item input by the user is specified.

In a memory area 230, cell angle data indicative of an acceptable angle range of each cell as shown in FIG. 22 is stored. The cell angle data is generated or updated by an acceptable angle setting program.

In a memory area 232, a cell selecting flag is stored. The cell selecting flag is a flag for indicating whether or not a cell except for the cell 0 is selected (direction input is performed). When the inclined amount of the analog joystick 94a is larger than a predetermined threshold value, it is considered that the user inputs a direction to turn the cell selecting flag on. In a memory area 234, a selected cell indicative of a currently selected cell (cell ID) is stored.

In a memory area 236, a cursor position is stored. The position information of the cursor 124 in the list 120 is stored. The position of the cursor 124 is set to the respective cells 1-16 in advance and stored. In the memory area 236, a position corresponding to a cell currently selected is stored.

In a memory area 238, temporary rearrangement data as shown in FIG. 27 is stored. When a temporary rearrangement is performed by a temporary rearrangement program, temporary rearrangement data indicative of items of the respective cells after the rearrangement is generated. In a case that the temporary rearrangement is performed, the input item is specified with reference to the temporary rearrangement data.

In a memory area 240, a character input history is stored. In this embodiment, when a predetermined operation is performed with the first controller 34 in a state that any one of the cells 1-16 is selected by a direction input with the analog joystick 94a, an input of an item (character) corresponding to the selected cell is determined to allow an input of the character. In the memory area 240, a character (character ID) corresponding to a cell selected by a direction input when a predetermined operation is detected on the basis of the controller data of the first controller 34 is stored.

In a memory area 242, a confirmed input is stored. In this embodiment, when a predetermined operation is performed with the first controller 34 in a state that a direction input is not performed with the analog joystick 94a, a character input is confirmed. Thus, when a predetermined operation is detected on the basis of the controller data of the first controller 34 in a state that no cell 1-16 is selected, a character input history of the memory area 240 is stored in the memory area 242 as a confirmed input.

Figure 29:
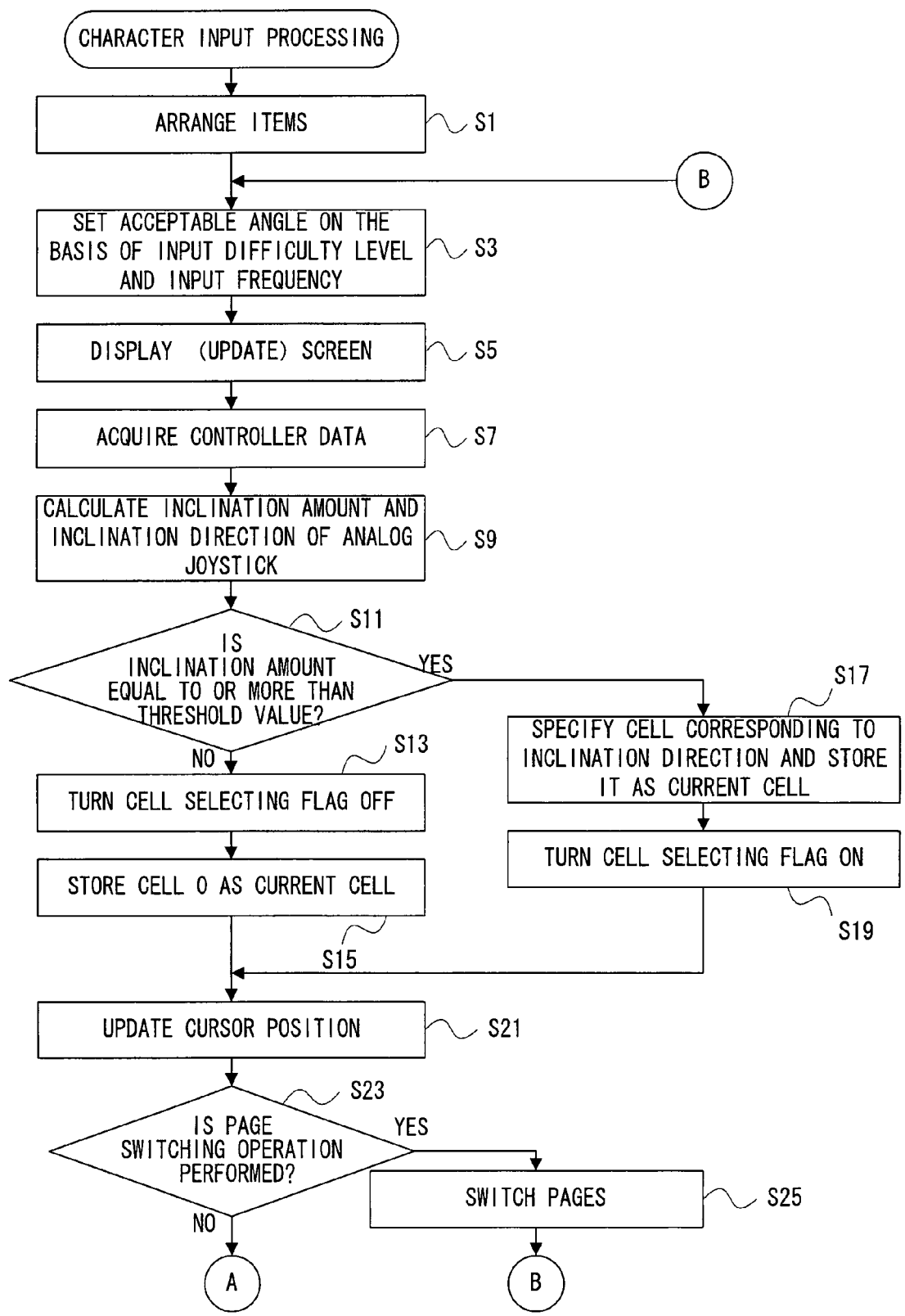
FIG. 29 is a flowchart showing a part of an example of an operation of character input processing in the game apparatus.
Figure 30:
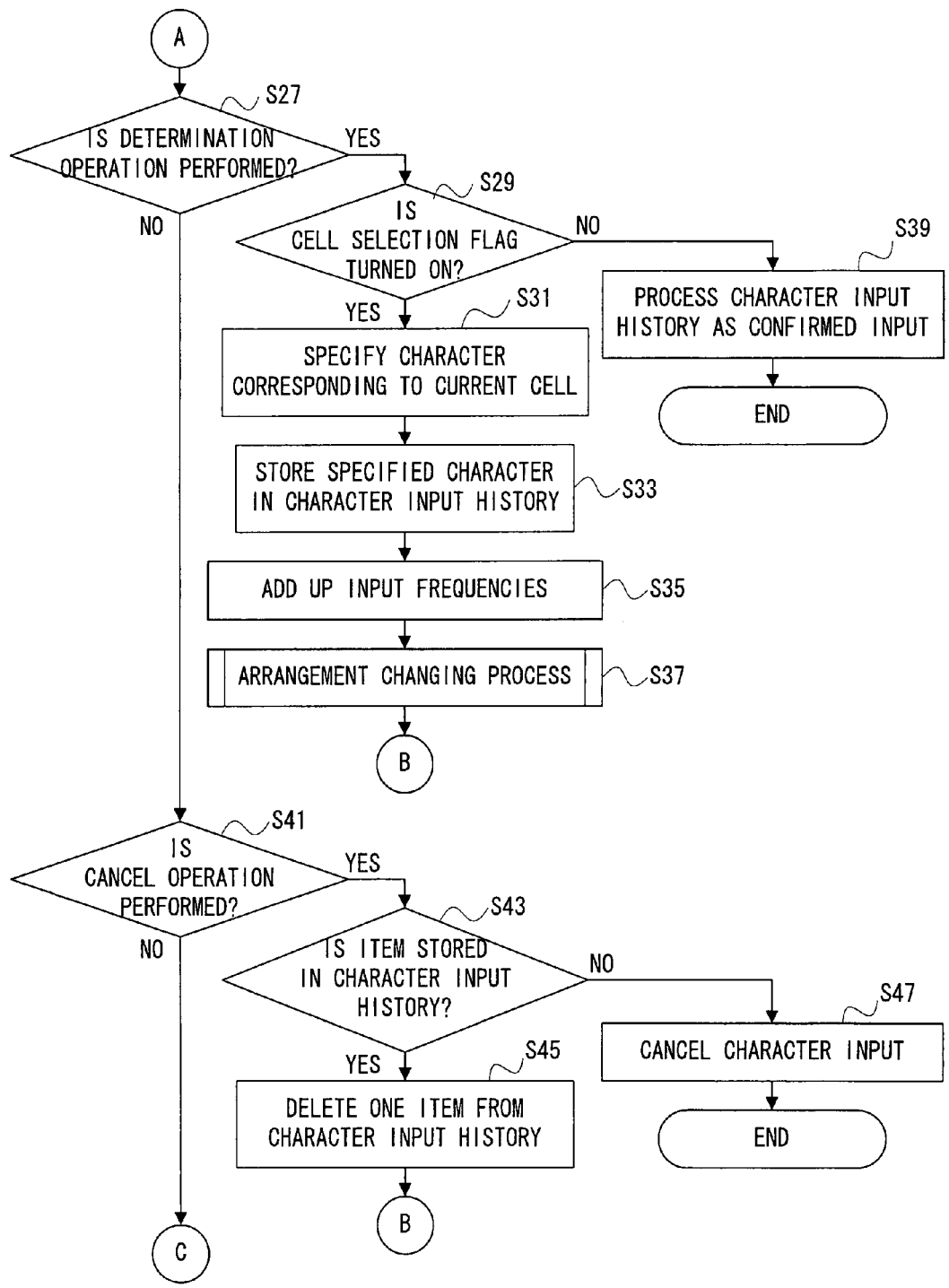
FIG. 30 is a flowchart showing a part of a continuation of FIG. 29.
Figure 31:
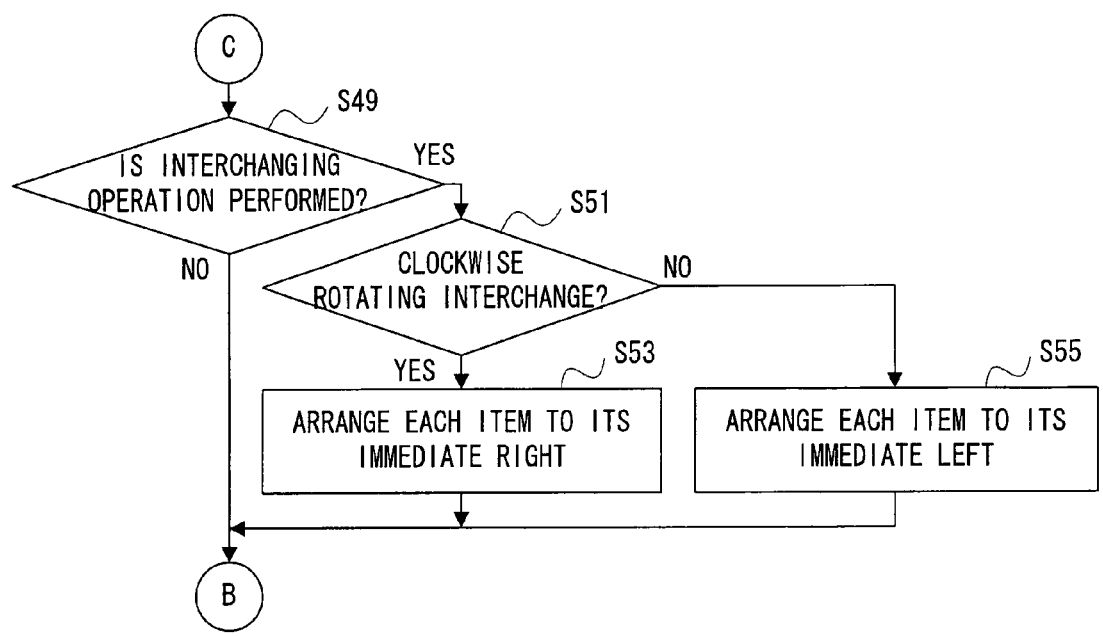
FIG. 31 is a flowchart showing a continuation of FIG. 30.

FIG. 29 to FIG. 31 show one example of an operation of the CPU 46 in the character input processing. When starting the character input processing, the CPU 46 first arranges items in the list 120 according to the item arrangement program in a step. S1. More specifically, items equal to or less than the predetermined number are selected from the item data, and the respective items are assigned to the cells 1-16. Then, selection item list data shown in FIG. 15 is generated and stored in the memory area 228. In this embodiment, the pre-determined number of the items out of the plurality of items (characters) are assigned to the predetermined page, and the step S1 is an initial setting of the list 120, and therefore, the selection items on the first page are brought into correspondence with the cells 1-16. By executing a static arrangement based on the input frequency, high-frequency items out of the predetermined number of the items included on the page are assigned to the cells corresponding to the vertexes of the guide 92a or the vertexes of the left, right, top and bottom directions. Alternatively, items having great amounts of information on output like a fixed phrase are assigned to the parts except for the vertexes of the guide 92a. Furthermore, with respect to the item arrangement, the sum total of a product between the input difficulty level di and the input frequency fi is calculated, and the calculated value is stored in a predetermined area of the data memory area 202.

Next, in a step S3, the CPU 46 sets an acceptable angle on the basis of the input difficulty level and the input frequency according to the acceptable angle setting program. As described with reference to FIG. 21, an acceptable angle range of each cell is calculated according to the conditional expression of the arrangement (Equation 1) and the boundary condition (Equation 2 and Equation 3). The cell angle data as shown in FIG. 22 is generated and stored in the memory area 230. The step S3 may be executed for each frame, but in a case that the known input frequency stored in the optical disk 22 in advance is utilized, setting the acceptable angle may be performed at first only, and in this case, it is possible to statically set directions on the basis of a proper input frequency to a certain extent in advance without movable correspondence with an input frequency by the user. Furthermore, only the arrangement changing processing in the step S37 described later allows a movable correspondence with an input frequency by the user, but in this case, the processing in the step S3 may be constructed to be omitted. On the contrary thereto, by executing the processing in the step S3 for each frame, it may be possible to correspond to the input frequency by the user, and omit the arrangement changing processing described later. In a case that both of the setting of the acceptable angle in the step S3 and the arrangement changing processing in the step S37 are executed for each frame, an assignment of the direction to the item can be performed more efficiently based on an input frequency by the user, but the frequency has to be set to the item. Thus, in a case that the input frequency data is stored by being associated with the cell, when changing the items in the arrangement changing processing, the input frequency data is also required to be changed.

Succeedingly, in a step S5, the CPU 46 displays or updates the screen. More specifically, the CPU 46 generates image data of the screen including a list 120 as shown in FIG. 9 by means of the GPU 52, and displays the screen on the monitor 30. With reference to the selection item list data and the item data, the respective items are displayed in an arrangement so as to be brought into correspondence with the positional relationship of the cells 1-16 as shown in FIG. 9. A cursor 124 is displayed at a cursor position. In a case that the cursor position indicates the cell 0, the cursor is not displayed. In a case that the selected cell of the memory area 234 is not the cell 0, an item corresponding to the selected cell is displayed in the display field 126. Furthermore, in a case that a character input history is stored in the memory area 240, a history of the input character is displayed in the input field 122.

In a step S7, the CPU 46 obtains controller data from the memory area 220. The controller data includes operation data of the operating portion 94 of the second controller 36, operation data of the operating portion 82 of the first controller 34, acceleration data of the acceleration sensors 86 and 96, imaging object data of the imaged information arithmetic section 88, etc. Thus, an operation signal (direction data), etc. of the analog joystick 94*a* can be obtained.

In a succeeding step S9, the CPU 46 calculates an inclination amount and an inclination direction of the analog joystick 94*a* from the operation signal according to the operation direction detecting program. The operation signal (X, Y) of the analog joystick 94*a* shows inclination amounts of the X direction and the Y direction (FIG. 20). Thus, by calculating the magnitude of the operation signal (X, Y), it is possible to obtain an inclination amount of the analog joystick 94*a* in whole. Furthermore, by calculating an angle θ (FIG. 20) of the operation signal (X, Y), it is possible to obtain an inclination direction, that is, an input direction of the analog joystick 94*a*.

Then, in a step S11, the CPU 46 determines whether or not the inclination amount is equal to or more than a predetermined threshold value. By the determination with respect to the threshold value, an unclear input can be removed, and it is possible to determine whether or not a direction input is performed with the analog joystick 94*a*.

If "NO" in the step S11, that is, if a direction input is not performed, the CPU 46 turns a cell selecting flag of the memory area 232 off in a step S13. Furthermore, in a step S15, the CPU 46 stores the cell 0 as a current cell in the memory area 234. It should be noted that an initial value of the selected cell to be stored in the memory area 234 is set to the cell 0.

On the other hand, if "YES" in the step S11, that is, if a direction input is performed, the CPU 46 specifies a cell corresponding to the inclination direction on the basis of the cell angle data according to the cell selecting program, and stores the cell as a current cell in the memory area 234 in a step S17. Furthermore, the CPU 46 turns the cell selecting flag of the memory area 232 on in a step S19.

After completion of the step S15 or S19, the CPU 46 updates a cursor position of the memory area 236 to that of the selected cell of the memory area 234 in a step S21. Additionally, the initial value of the cursor position is set to a position corresponding to the cell 0. Accordingly, in the initial state, displaying the cursor is not performed.

Succeedingly, in a step S23, the CPU 46 determines whether or not a page switching operation is performed. The page switching operation is that a predetermined series of direction inputs is performed, for example, and is determined on the basis of a shift of the direction data. For example, determination of one rotation of the analog joystick 94*a* allows a page switching operation. Alternatively, a fact that a predetermined operating switch (1 button 82*b*, for example) is operated, a fact that predetermined acceleration data is detected by the acceleration sensor 86 or 96, and so forth may be selected as a page switching operation. In a case of few items to be selected, that is, in a case of a single page, for example, the processing needs not to be performed.

If "YES" in the step S23, the CPU 46 executes page switching processing in a step S25. For example, in the selection item list data of the memory area 228, all the items are interchanged with the items on the next page. In the page switching also, similarly to the item arrangement in the step S1, a static arrangement based on the input frequency may be executed. After completion of the step S25, the process returns to the step S3.

On the other hand, if "NO" in the step S23, the process proceeds to a next step S27 in FIG. 30. In the step S27 in FIG. 30, the CPU 46 determines whether or not a determination operation is performed. The determination operation is an operation for instructing determination of a character input by the user, and is that the A button 82*d* or the C button 94*b* is depressed, for example. The determination is performed on the basis of the operation data of the first controller 34 or the operation data of the second controller 36.

Furthermore, in another embodiment, for determining a determination operation, data obtained by the acceleration sensors 86 and 96 or the imaged information arithmetic section 88 may be utilized in place of the data obtained by a button operation of the operating portions 82 and 94 of the controller 14. For example, when an acceleration value, a changed amount of acceleration, or the like satisfying a predetermined condition by the acceleration sensor 86 or the acceleration sensor 94 are detected, that is, when a predetermined motion is detected by the first controller 34 or the second controller 36, a determination of the character input may be performed. Alternatively, when it is determined that an instruction position, change of the instruction position, or the like by the first controller 34 satisfies a predetermined condition on the basis of data obtained by the imaged information arithmetic section 88, that is, a predetermined motion is detected by the first controller 34, determination of the character input may be performed.

If "YES" in the step S27, the CPU 46 determines whether or not the cell selecting flag of the memory area 232 is turned on in a step S29. If "YES" in the step S29, that is, if the A button 82*d* is pushed (determination operation is performed) in a state that a direction input by the analog joystick 94*a* is performed, it is considered that the character to be input by the user is determined. Accordingly, in a step S31, the CPU 46 specifies a character corresponding to the current cell with reference to the selection item list data in the memory area 228. Additionally, when a temporary rearrangement described later is performed to generate temporary rearrangement data in the memory area 238, the temporary rearrangement data is referred. Succeedingly, in a step S33, the CPU 46 outputs a specified character, that is, stores it in the character input history of the memory area 240. It should be noted that since the temporary rearrangement is only performed until an input is determined by the user, the temporary rearrangement data of the memory area 238 is deleted after the input character is specified on the basis of the temporary rearrangement data.

Then, in a step S35, the CPU 46 adds up the input frequencies according to the input frequency calculating program. For example, a ratio of the number of inputs with respect to the items to the total number of inputs, and etc. is only necessary to be calculated. Thus, in response to an input, an input frequency fi of the input character is increased, input frequencies of other characters are decreased, and the input frequency data of the memory area 224 is updated. Furthermore, the input frequency is not strictly restricted to the ratio of the number of inputs, and may be shown as a level including several levels, for example. That is, any value indicative of a frequency would be set as a calculation method. Furthermore, frequencies in all the inputs may be calculated, but input histories for the most recent at n-th times coming are stored, and an input frequency with respect to each of the characters for the n-th times may be calculated.

Figure 32:
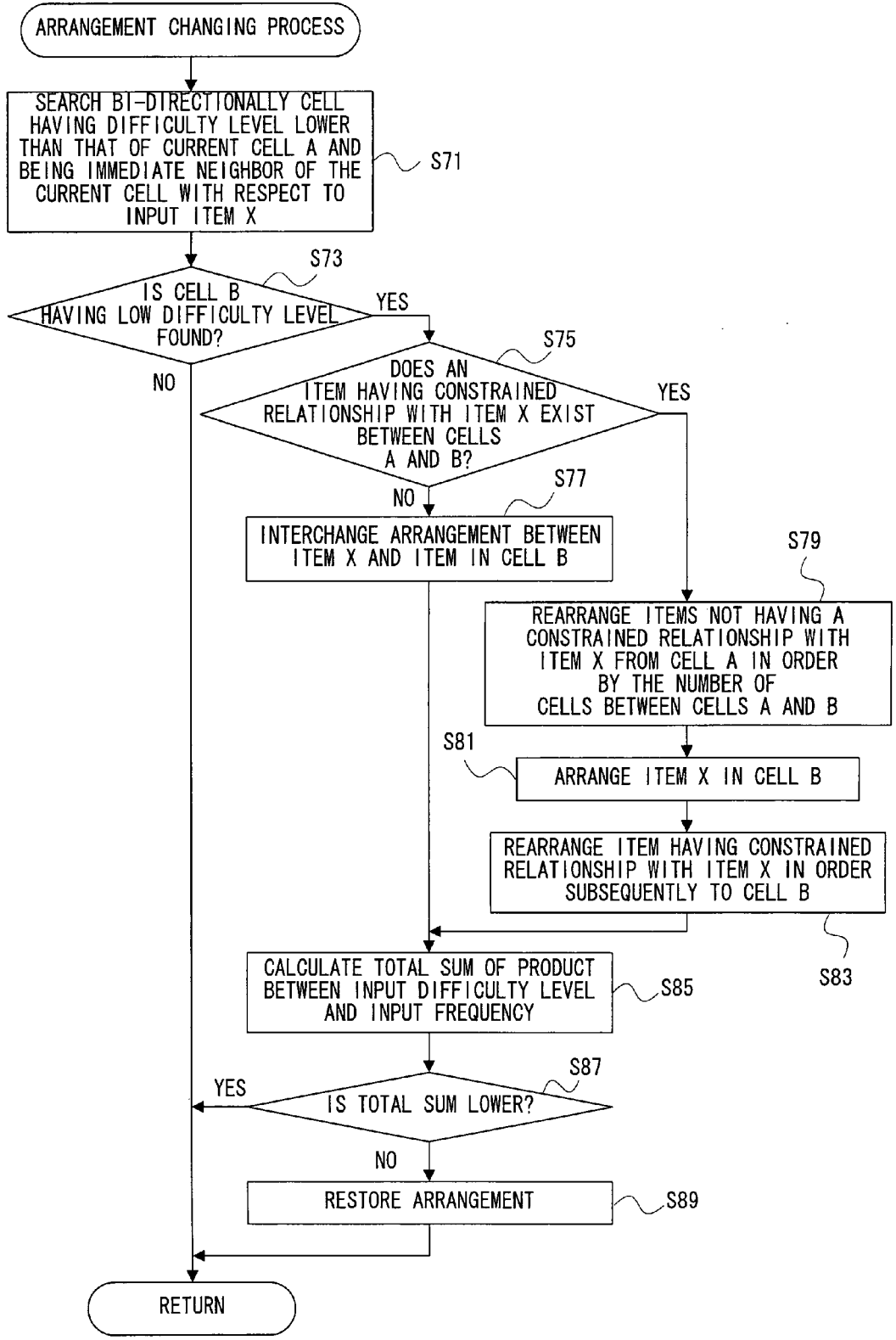
FIG. 32 is a flowchart showing one example of an operation of arrangement changing processing in FIG. 30.

In addition, in a step S37, the CPU 46 executes arrangement changing processing according to the arrangement changing program. FIG. 32 shows one example of an operation of the arrangement changing processing. By the arrangement changing processing, the arrangement stored in the selection item list data is changed on the basis of the input difficulty level and the input frequency as required.

In a step S71 in FIG. 32, the CPU 46 searches a cell having a difficulty level lower than that of the current cell A and being immediate neighbor of the current cell A in the both directions with respect to the input item X. More specifically, with reference to the input difficulty level data in the memory area 226, an input difficulty level di of the current cell of the memory area 234 is read, and the cell having a difficulty level lower than the input difficulty level di and being immediate neighbor are searched in the clockwise and counterclockwise directions.

Next, in a step S73, the CPU 46 determines whether or not the cell B having a low difficulty level is found. If "NO" in the step S73, a suitable change of the arrangement cannot perform any more, and therefore, the arrangement changing processing is ended.

On the other hand, if "YES" in the step S73, the arrangement of the input item X is intended to be changed so as to be in a cell with a lower difficulty level. If the cell B is found in the clockwise and counterclockwise directions, the arrangement of the input item X is intended to be changed so as to be in each of the cells B. Additionally, for restoring the change of the arrangement, the current selection item list data stored in the memory area 228 is temporarily stored in another area of the data memory area 202.

First, in a step S75, the CPU 46 determines whether or not an item having a constrained relationship with item X exists between the cells AB on the basis of the selection item list data. It should be noted that the constrained relationship is set in advance to the same kind of the item group which is hard to understand the arrangement if the order is shuffled. More specifically, the constrained relationship is the arrangement of numerics 1-9, alphabetic characters, etc., which makes it easy to understand the arrangement owing to its ascending or descending order. Various constrained relationships can be set in advance to other item groups as necessary. Thus, it is determined whether or not an item with a kind the same as the kind (alphabetic characters, symbols, numerics, etc.) of the item X is present between the cells AB. The kind of the item is stored by being brought into correspondence with an item ID in the item data, for example.

If "NO" in the step S75, that is, if the anteroposterior relationship between the order of the items can be maintained as it is, the CPU 46 interchanges the arrangement between the item X and the item of the cell B in the selection item list data in a step S77. That is, the item of the cell B is arranged in the cell A, and the item X is arranged in the cell B.

On the other hand, if "YES" in the step S75, that is, if the constrained condition cannot be satisfied by a simple change of the arrangement, the CPU 46 rearranges items not having a constrained relationship with the item X from the cell A in order by the number of the cells between the cells AB in the selection item list data in a step S79. Thus, the items which do not have a constrained relationship with the item X are arranged from the cell A to the cell B. Succeedingly, in a step S81, the CPU 46 arranges the item X in the cell B in the selection item list data. Then, in a step S83, the CPU 46 rearranges the items having a constrained relationship with the item X in order subsequently to the cell B in the selection item list data. For example, the items with a constrained relationship which were between the cells AB are arranged in the cells subsequently to the cell B. In a case that the items having a constrained relationship are arranged in the cells subsequently to the cell B as an object to be rearranged, the items having a constrained relationship are also arranged in order subsequently to the cells in which the items having a constrained relationship between the cells AB are arranged. By such a rearrangement, it is possible to change the arrangement while maintaining the anteroposterior relationship of the order of the items.

After completion of the step S77 or S83, the CPU 46 calculates a total sum of the product between the input difficulty level di and the input frequency fi, that is, an evaluation function with respect to a new arrangement in a step S85. Then, in a step S87, the CPU 46 determines whether or not the total sum is lower than that before the change of the arrangement. If "YES" in the step S87, that is, if the evaluation function becomes smaller, the change of the arrangement is adopted, and then, the arrangement changing processing is ended. Additionally, the value of the evaluation function at this time is stored in a predetermined area of the data memory area 202 so as to be compared as a value before the change of arrangement in the next processing.

On the other hand, if "NO" in the step S87, that is, if the evaluation function does not become smaller, it is understood that the arrangement before the change of the arrangement is more suitable. Thus, the CPU 46 restores the arrangement, that is, restores the selection item list data in the memory area 228 to the data before change in a step S89. After completion of the step S89, the arrangement changing processing is ended to return to the step S3 in FIG. 29. Thus, when the arrangement is changed, the respective items are displayed by a new arrangement on the screen. Furthermore, a character stored in the character input history is displayed in the input field 122 on the screen.

Furthermore, if "NO" in the step S29 in FIG. 30, that is, if a determination operation (pressing the A button 82d, etc.) is performed in a state that a direction input with the analog joystick 94a is not performed, it is considered that the user finishes inputting the character. Thus, in a step S39, the CPU 46 processes the character input history in the memory area 240 as a confirmed input. For example, the character input history is output (stored) to a predetermined memory area 242 as a confirmed input, processing utilizing textual information of the confirmed input is executed, and so forth. After completion of the step S39, the character input processing is ended.

Furthermore, if "NO" in the step S27, the CPU 46 determines whether or not a cancel operation is performed in a step S41. The cancel operation is an operation for instructing deletion of the character previously input by the user or cancellation of inputting the character, and is to push the B button 82h or the Z button 94c, for example. The determination is performed on the basis of the operation data of the first controller 34 or the operation data of the second controller 36.

In a case that the determination operation is assigned to the C button 94b, and the cancel operation is assigned to the Z button 94c, all of the analog joystick 94a for a selection operation, the C button 94b for a determination operation, and the Z button 94c for a cancel operation are provided to the housing 92 of the second controller 36 holdable with a single hand, allowing the user to make an input with a single hand. In addition, the analog joystick 94a is provided in such a position that the thumb is placed when the user holds the housing with a single hand, and the Z button 94c and the C button 94b are provided in such positions that the index finger or the middle finger is placed when the user holds the housing with a single hand, capable of improve operability.

Furthermore, in another embodiment, for determining a cancel operation, data obtained by the acceleration sensors 86 and 96, or the imaged information arithmetic section 88 may be used in place of the data obtained by an button operation of the operating portions 82 and 94 of the controller 14. For example, when an acceleration value, a changed amount of acceleration, etc. satisfy a predetermined condition is detected by the acceleration sensor 86 or the acceleration sensor 94, that is, when a predetermined motion is detected by the first controller 34 or the second controller 36, cancellation of the input of the character may be performed. Alternatively, when it is determined that an instruction position, change of the instruction position by the first controller 34, etc. satisfies a predetermined condition on the basis of the data obtained by the imaged information arithmetic section 88, that is, a predetermined motion is detected by the first controller 34, cancellation of the character may be performed.

In a further embodiment, an item for cancellation may be provided in the selection item of the list 120.

If "YES" in the step S41, the CPU 46 determines whether or not an item is stored in the character input history memory area 240 in a step S43. If "YES" in the step S43, it is considered that the input of the character immediately before is cancelled. Thus, in a step S45, the CPU 46 deletes from the character input history of the memory area 240 one item (character or character string) input last. After completion of the step S45, the process is returned to the step S3 in FIG. 29. Thus, the character input last is deleted in the input field 122 of the screen.

On the other hand, if "NO" in the step S43, that is, when a cancel operation (pushing the B button 82*h*, etc.) is performed in a state that no item is input, it is considered that inputting the character itself is cancelled. Thus, the CPU 46 executes cancellation of the character input in a step S47, and ends the character input processing.

Alternatively, if "NO" in the step S41, the CPU 46 determines whether or not an interchanging operation is performed in a step S49 in FIG. 31. The interchanging operation is an operation for allowing the user to instruct execution of an interchanged arrangement as a temporary rearrangement, and including pushing the −button 82*e* and the +button 82*g*, for example. The determination is performed on the basis of operation data of the first controller 34.

If "YES" in the step S49, the CPU 46 determines whether or not a clockwise rotating interchange is instructed, that is, whether or not the +button 82*g* is pushed on the basis of the operation data of the first controller 34 in a step S51. If "YES" in the step S51, the CPU 46 arranges each item to its immediate right cell in a step S53. More specifically, the selection item list data of the memory area 228 is copied to generate temporary rearrangement data in the memory area 238, and with respect to the temporary rearrangement data, each item is brought into correspondence with the cell to its immediate right.

On the other hand, if "NO" in the step S51, that is, if the −button 82*e* is pushed, the CPU 46 arranges each item in the cell to its immediate left in a step S55. More specifically, the selection item list data of the memory area 228 is copied to generate temporary rearrangement data in the memory area 238, and in the temporary rearrangement data, each item is brought into correspondence with the cell to its immediate left. After completion of the step S53 or S55, the process returns to the step S3 in FIG. 29. Thus, in a case of an interchanging arrangement, the list 120 in which the items are interchanged in a direction corresponding to the vertex of the guide 92*a* and in directions corresponding to the parts except for the vertexes is provided. Furthermore, if "NO" in the step S49, the process also returns to the step S3 in FIG. 29.

According to this embodiment, in the item selection by utilizing a direction instruction, a static arrangement and/or a movable arrangement for assigning each item to a direction on the basis of an input frequency to the item is executed, and therefore, it is possible to improve operability of the item selection.

In addition, items assigned to the directions corresponding to the vertexes of the guide 92*a* and items assigned to the parts except for the vertexes are temporarily interchanged in response to a predetermined operation, and therefore, it is possible to make it easy to input an item assigned to a hard-to-input direction.

Furthermore, an input frequency is calculated, and the change of an arrangement is performed on the basis of the input frequency, and therefore, it is possible to change a direction assigned to the item with a high input frequency from a hard-to-input direction to an easy-to-input direction by the movable arrangement.

Figure 33:
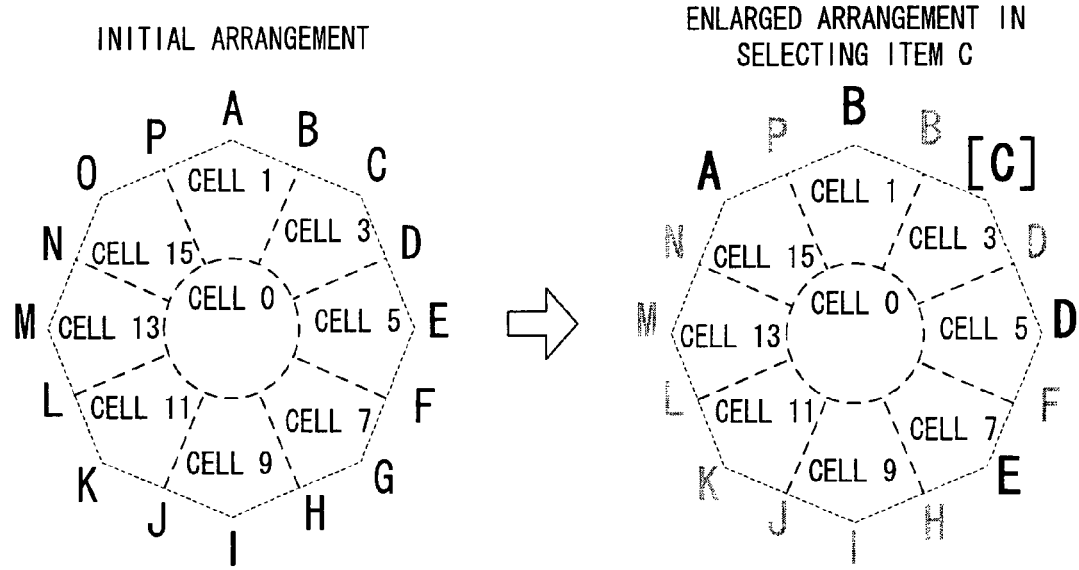
FIG. 33 is an illustrative view showing one example of an enlarged arrangement of items.

FIG. 33 shows one example of an enlarged arrangement as a temporary rearrangement to be executed in another embodiment. In this embodiment, a direction input for selecting an item is restricted to the directions corresponding to the vertexes of the guide 92*a*. In addition, items other than these can be selected by a direction input at two-level in place of being brought into correspondence with the directions on the side.

More specifically, when a direction corresponding to a vertex of the guide 92*a* is input, the items except for the items assigned to the vertexes are temporarily assigned to the vertexes except for the vertex corresponding to the input direction until a determination operation is performed.

In FIG. 33, alphabetic characters A-P are arranged as an initial arrangement. The characters A, C, E, G, I, K, M, and O are respectively corresponded to the cells 1, 3, 5, 7, 9, 11, 13, and 15. The items other than these are set so as to be selected by a two-level direction input. More specifically, a selection item list in which the cells 2, 4, 6, 8, 10, 12, 14, 16 is set as cell to which no area is set for the sake of convenience is generated, and at a time of display, the items may be displayed between the items corresponding to the vertexes. In this case, the cells with the above-described even number are not selected by a direction input, but are executed by a program considering that they are adjacent to the cells with the odd number, and becomes selectable at a second-level selection. In FIG. 33, the character C arranged in the cell 3 is instructed by a direction input. At this time, the items B and D displayed at cells adjacent to the character C are arranged at positions corresponding to the cells (cells 1 and 5) of the vertexes adjacent to the character C. Two items A and E which were displayed in the cells of the vertexes adjacent to the C are arranged at positions corresponding to the cells of the vertexes next but one (cell 15 and 7) in the both directions from the C. That is, in the temporary rearrangement, the predetermined number of the items (A, B, D, E) displayed in the proximity of the item (C) assigned to the vertex instructed at first are assigned to the vertexes near the vertex. In this embodiment, the items (A, E) assigned to the vertexes adjacent to the instructed vertex are also temporarily rearranged in other vertexes, but at least the items (B, D) displayed at the cells adjacent to the instructed vertex are only necessary to be temporarily arranged in the cells of the vertexes adjacent thereto.

Additionally, in FIG. 33, items other than the items (A, B, D, E) temporarily rearranged and the item (C) instructed by a direction input are displayed in grey to thereby make the items which are not temporarily rearranged unselectable. However, in another embodiment, the items which are not temporarily rearranged may also be made selectable.

Thus, the arrangement of the plurality of items near the item instructed by a direction input is enlarged. Even if a desired item does not correspond with the vertex, by inputting a direction of a vertex corresponding to an item adjacent to the item, the user can temporarily rearrange the item from the part except for the vertex to the vertex. Then, by instructing a direction corresponding to the vertex at which the item is temporarily rearranged, it is possible to easily instruct the item. According to the enlarged arrangement, by inputting directions corresponding to the vertexes of the guide 92a at two levels, it is possible to easily select a desired item.

Figure 34:
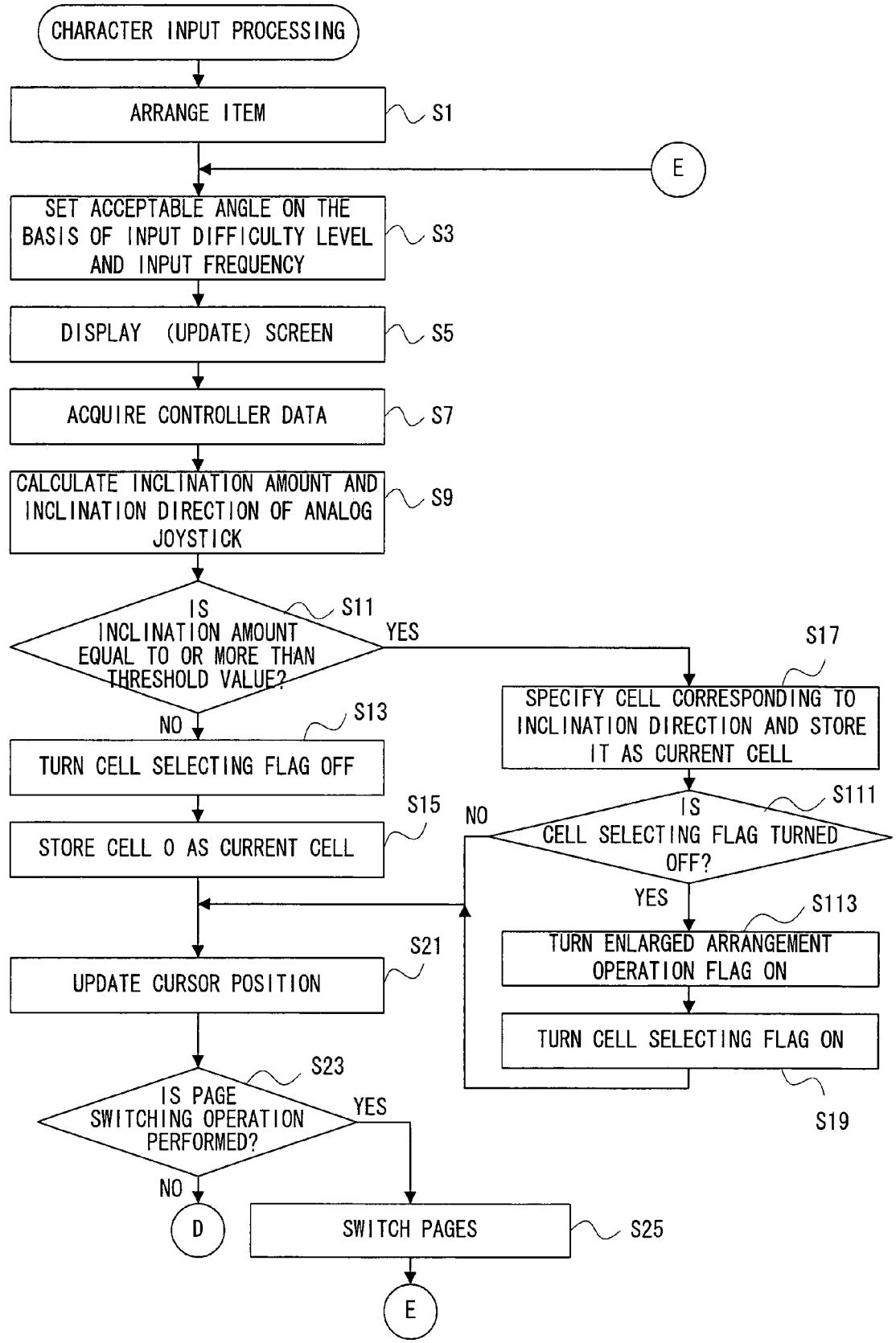
FIG. 34 is a flowchart showing a part of one example of an operation of character input processing including the enlarged arrangement.
Figure 35:
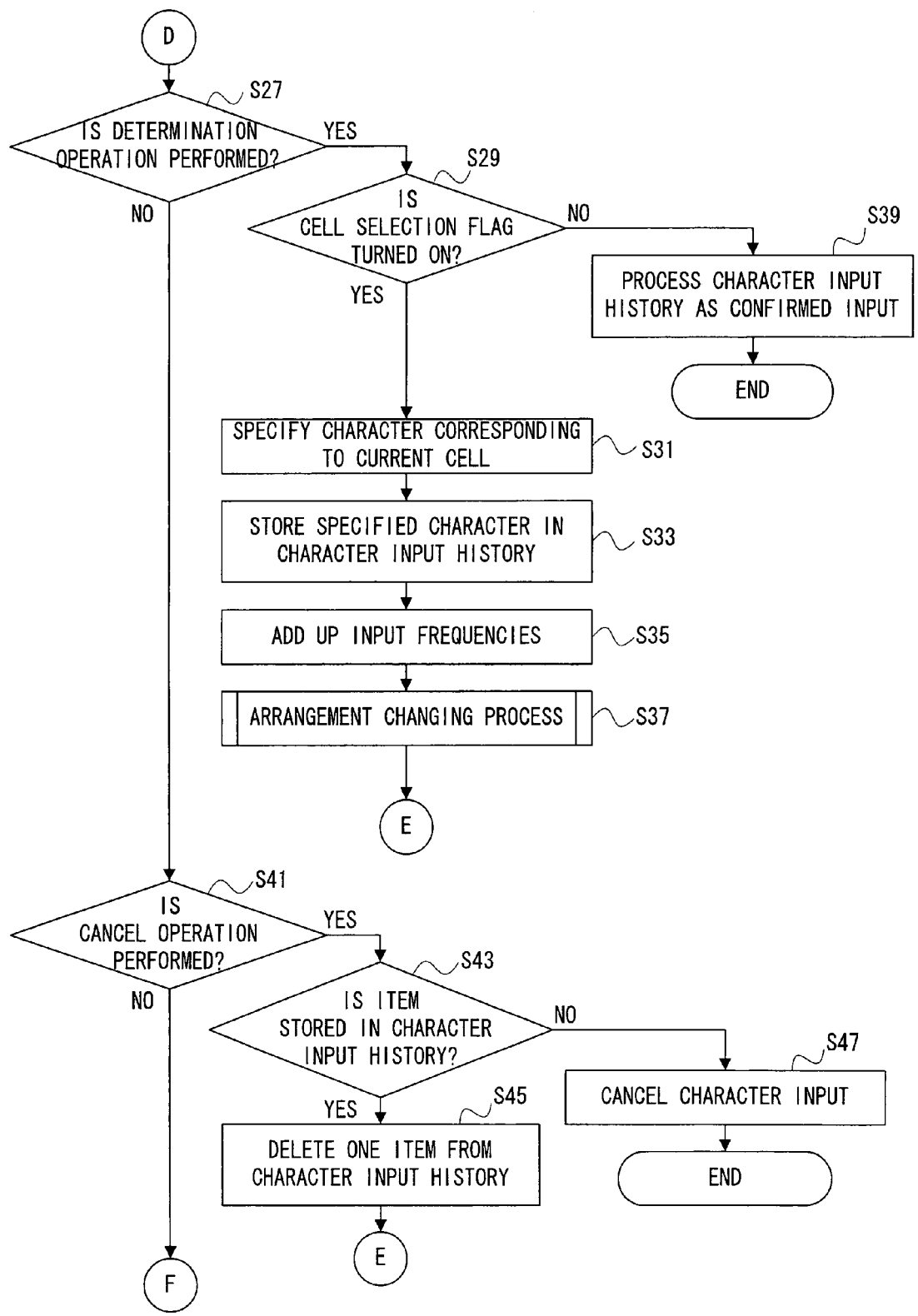
FIG. 35 is a flowchart showing a part of a continuation of FIG. 34.
Figure 36:
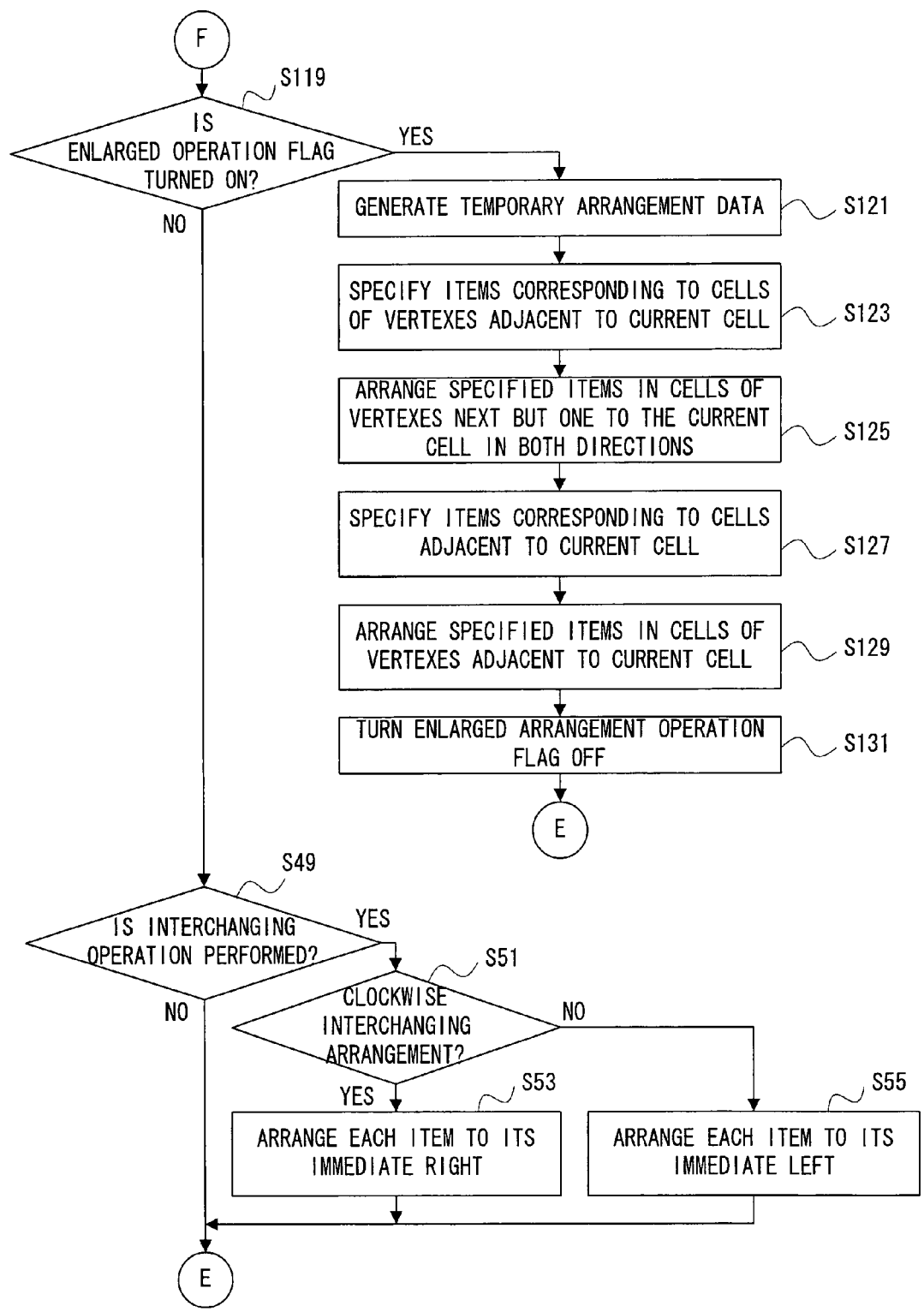
FIG. 36 is a flowchart showing a continuation of FIG. 35.

FIG. 34 to FIG. 36 show one example of an operation of the character input processing in this embodiment. It should be noted that processing in FIG. 34 to FIG. 36 similar to the character input processing described in FIG. 29 to FIG. 31 are identified by the same reference numerals, and the detailed description thereof will be omitted.

In a step S17 in FIG. 34, a cell corresponding to the inclination direction of the analog joystick 94a is specified, and then, it is determined whether or not an enlarged arrangement operation is performed. In this embodiment, a condition of execution of the enlarged arrangement is that an input to a direction corresponding to the vertex is performed from a no-input state (that is, a state in which the cell 0 is selected) by utilizing the analog joystick 94a. Thus, the CPU 46 determines whether or not a cell selecting flag of the memory area 232 is turned off in a step S111. That is, it is determined whether or not a direction input was not performed at a previous frame.

If "YES" in the step S111, the CPU 46 turns on an enlarged arrangement operation flag provided in a predetermined area of the data memory area 202 in a step S113. After completion of the step S113, the process proceeds to a step S19. Furthermore, if "NO" in the step S111, that is, if a direction input from a no-input state is absent, the process proceeds to a step S21.

If "YES" in the step S29 in FIG. 35, that is, in a case that a determination operation is performed in a state that a direction input is performed, an input to an item arranged at the vertex is determined. Thus, in a step S31, an item, that is, an input character is specified on the basis of the temporary rearrangement data.

If "NO" in the step S41 in FIG. 35, the CPU 46 determines whether or not the enlarged arrangement operation flag is turned on in a step S119 in FIG. 36. If "YES" in the step S119, that is, when an enlarged arrangement operation is performed, the CPU 46 copies selection item list data in the memory area 228 in a step S121 to generate temporary rearrangement data to the memory area 238.

Succeedingly, the CPU 46 specifies items corresponding to the cells of the vertexes adjacent to the current cell with reference to the selection item list data in a step S123. That is, in this embodiment, adjacent items are specified among the cells with the odd number. Then, in a step S125, the CPU 46 arranges the specified items in the cells of the vertexes next but one to the current cell in the both directions in the temporary rearrangement data.

In addition, in a step S127, the CPU 46 specifies items corresponding to the cells adjacent to the current cell with reference to the selection item list data. That is, in this embodiment, items corresponding to the cells with the even number (area is not set) adjacent to the current cell with the odd number are specified. Then, in a step S129, the CPU 46 arranges the specified items in the cells (cells with the odd number) of the vertexes adjacent to the current cell in the temporary rearrangement data.

The CPU 46 has performed a temporary rearrangement in response to the enlarged arrangement operation, and thus turns the enlarged arrangement operation flag stored in the data memory area 202 off in a step S131. After completion of the step S131, the process returns to the step S3 in FIG. 34. Furthermore, if "NO" in the step S119, that is, if an enlarged arrangement operation is not performed, the process proceeds to a step S49.

According to this embodiment, when an input direction indicates a direction corresponding to the vertex of the guide 92a, items assigned to the directions corresponding to the parts except for the vertexes (items except for the items assigned to the directions of the vertexes) are temporarily assigned to the directions corresponding to the vertexes, and therefore, it is possible to easily select items assigned to a hard-to-input direction.

Additionally, in each of the above-described embodiments, a temporary rearrangement such as an interchanged arrangement, an enlarged arrangement, etc. is performed on the selection item list on which an item arrangement is performed on the basis of an input frequency in the item arrangement processing in the step S1. However, in another embodiment, a temporary rearrangement may be performed on a selection item list on which items are arranged without taking an input frequency into account. This is because that by the temporary rearrangement, even the items arranged in the parts except for the vertexes with a high input difficulty level can simply be rearranged at the vertexes with a low input difficulty level as described above.

Furthermore, in each of the above-described embodiments, an input of the direction for selecting an item is performed by the analog joystick 94a. However, the input device for a direction input can be changed as necessary. For example, a cross key 82a capable of instructing upper, lower, right and left directions may be used. In a case of the cross key 82a, cells and selection items are assigned to the directions corresponding to the vertexes and the sides of a rectangle, for example. Additionally, if the two adjacent operating portions out of the four operating portions including the left, right, top and bottom directions of the cross key 82a are simultaneously pushed, an input in an oblique direction is detected. Alternatively, an electrostatic or a pressure sensitive track pad (touch pad) may be used. In this case, an input direction by the user can be detected from a touched position seen from a reference position of the touch pad, a direction of the current touched position seen from the previous touched position, or the like. Pointing devices except for the touch pad, such as a mouse, for example, may be applied. Furthermore, similarly to the above-described analog joystick 94a with the guide 92a, by forming the track pad with a polygonal guide, it is possible to make a direction input corresponding to the vertex easy.

In each of the above-described embodiments, the shape of the guide 92a is an octagon, but a guide for a direction input may be a polygon other than the octagon or another shape having a plurality of angles. With respect to any polygonal shape, it is possible to arrange items by bringing them into correspondence with the vertexes and the sides of the polygon. Here, if only the shape has a plurality of angles, even if it does not take the form of a strictly polygon, it functions as a guide, and therefore, the shape includes a curve, for example. Furthermore, the items are brought into correspondence with only the vertexes without being brought into correspondence with the sides.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information selecting apparatus which makes a user select an arbitrary item from a plurality of items, comprising:
   a direction input unit for allowing an input operation of a direction and inputting direction data indicative of a direction corresponding to the input operation,
   an operating unit for inputting operation data in correspondence with a predetermined operation, a storing medium for storing item data indicative of said plurality of items, a selection item setting programmed logic circuitry for setting the predetermined number of the items out of said item data as a selection item which is assigned to a predetermined direction on the basis of an input frequency to each item, and a selecting programmed logic circuitry for selecting from said selection item an item corresponding to said direction data from said direction input unit, and outputting said item when predetermined first operation data is input.

2. An information selecting apparatus according to claim 1, wherein said direction input unit has a polygonal guide, and said selection item setting programmed logic circuitry assigns said predetermined number of the items to a direction corresponding to a vertex of said guide and a direction corresponding to a part except for the vertex of said guide.

3. An information selecting apparatus according to claim 1, wherein said direction input unit has a input difficulty level at a plurality of levels depending on an input direction, and said selection item setting programmed logic circuitry assigns said selection item to a predetermined direction on the basis of a further input difficulty level as to the direction.

4. An information selecting apparatus according to claim 2, wherein said direction input unit has an input difficulty level at a plurality of levels depending on an input direction, and said selection item setting programmed logic circuitry assigns said selection item to a predetermined direction on the basis of a further input difficulty level as to the direction.

5. An information selecting apparatus according to claim 2, wherein said selection item setting programmed logic circuitry assigns a high-frequency item to a direction corresponding to a vertex of said guide on the basis of statistical information of an input frequency of said item.

6. An information selecting apparatus according to claim 2, wherein said guide has an octagonal shape, and said selection item setting programmed logic circuitry assigns high-frequency items to directions corresponding to predetermined four vertexes of said guide on the basis of statistical information of an input frequency of said items.

7. An information selecting apparatus according to claim 2, wherein said selection item setting programmed logic circuitry assigns an item having great amounts of information on output to a direction corresponding to a part except for the vertex of said guide.

8. An information selecting apparatus according to claim 1, further comprising:

a frequency storing programmed logic circuitry for calculating and storing an input frequency to said item on the basis of a selection result by said selecting programmed logic circuitry, wherein said selection item setting programmed logic circuitry assigns said predetermined number of the items to a direction on the basis of an input frequency stored in said frequency storing programmed logic circuitry.

9. An information selecting apparatus according to claim 8, wherein said direction input unit has a polygonal guide, said selection item setting programmed logic circuitry assigns said predetermined number of the items to a direction corresponding to a vertex of said guide and a direction corresponding to a part except for the vertex of said guide, and performing a change of an assignment based on the input frequency such that a high-frequency item is assigned to a direction corresponding to a vertex of said guide on the basis of the input frequency stored in said frequency storing programmed logic circuitry.

10. An information selecting apparatus according to claim 8, wherein said selection item setting programmed logic circuitry changes a range of a direction such that a range of the direction assigned to a high-frequency item is relatively larger than ranges of directions assigned to other items on the basis of the input frequency stored in said frequency storing programmed logic circuitry.

11. An information selecting apparatus according to claim 2, further comprising a temporary rearranging programmed logic circuitry for temporarily assigning, with respect to said selection item, an item except for an item assigned to the direction of said vertex of said guide to a direction corresponding to a vertex except for the vertex corresponding to the input direction until said predetermined first operation data is input when direction data indicative of a direction corresponding to said vertex of said guide is input.

12. An information selecting apparatus according to claim 2, further comprising an interchanging programmed logic circuitry for interchanging the item assigned to the direction corresponding to the vertex of said guide and the item assigned to the direction corresponding to a part except for said vertex with respect to said selection item when predetermined second operation data is input.

13. A storage medium storing an information selecting program to be executed in a computer of an information selecting apparatus having a direction input unit for allowing an input operation of a direction and inputting direction data indicative of a direction corresponding to the input operation, an operating unit for inputting operation data in correspondence with a predetermined operation, and a storing medium for storing item data indicative of said plurality of items, and making a user select an arbitrary item from a plurality of items, wherein said information selecting program makes said computer execute:

a selection item setting step for setting the predetermined number of the items out of said item data as a selection item which is assigned to a predetermined direction on the basis of an input frequency to each item, and a selecting step for selecting from said selection item an item corresponding to said direction data from said direction input unit, and outputting said item when predetermined first operation data is input.

14. An information selecting apparatus making a user select an arbitrary item from a plurality of items, comprising:

a direction input unit for allowing an input operation of a direction via a polygonal guide and inputting direction data indicative of a direction corresponding to the input operation, an operating unit for inputting operation data in correspondence with a predetermined operation, a storing medium for storing item data indicative of said plurality of items, a selection item setting programmed logic circuitry for setting the predetermined number of the items out of said item data as a selection item which is assigned to a direction corresponding to a vertex of said guide and a direction corresponding to a part except for the vertex of said guide, a selecting programmed logic circuitry for selecting from said selection item an item corresponding to said direction data from said direction input unit, and outputting said item when predetermined first operation data is input, and a temporary rearranging programmed logic circuitry for temporarily assigning, with respect to said selection item, an item except for an item assigned to the direction of said vertex of said guide to a direction corresponding to a vertex except for the vertex corresponding to the input direction until said predetermined first operation data is input when direction data indicative of a direction corresponding to said vertex of said guide is input.

15. A storage medium storing an information selecting program to be executed in a computer of an information selecting apparatus having a direction input unit for allowing an input operation of a direction via a polygonal guide and inputting direction data indicative of a direction corresponding to the input operation, an operating unit for inputting operation data in correspondence with a predetermined operation, and a storing medium for storing item data indicative of said plurality of items, and making a user select an arbitrary item from a plurality of items, wherein said information selecting program makes said computer execute:

a selection item setting step for setting the predetermined number of the items out of said item data as a selection item which is assigned to a direction corresponding to a vertex of said guide and a direction corresponding to a part except for the vertex of said guide, a selecting step for selecting from said selection item an item corresponding to said direction data from said direction input unit, and outputting said item when predetermined first operation data is input, and a temporary rearranging step for temporarily assigning, with respect to said selection item, an item except for an item assigned to the direction of said vertex of said guide to a direction corresponding to a vertex except for the vertex corresponding to the input direction until said predetermined first operation data is input when direction data indicative of a direction corresponding to said vertex of said guide is input.

16. An information selecting apparatus making a user select an arbitrary item from a plurality of items, comprising:

a direction input unit for allowing an input operation of a direction via a polygonal guide and inputting direction data indicative of a direction corresponding to the input operation, an operating unit for inputting operation data in correspondence with a predetermined operation, a storing medium for storing item data indicative of said plurality of items, a selection item setting programmed logic circuitry for setting the predetermined number of the items out of said item data as a selection item which is assigned to a direction corresponding to a vertex of said guide and a direction corresponding to a part except for the vertex of said guide, a selecting programmed logic circuitry for selecting an item corresponding to said direction data from said direction input unit, and outputting said item when predetermined first operation data is input, and an interchanging programmed logic circuitry for interchanging the item assigned to the direction corresponding to the vertex of said guide and the item assigned to the direction corresponding to a part except for said vertex with respect to said selection item when predetermined second operation data is input.

17. A storage medium storing an information selecting program to be executed in a computer of an information selecting apparatus having a direction input unit for allowing an input operation of a direction via a polygonal guide and inputting direction data indicative of a direction corresponding to the input operation, an operating unit for inputting operation data in correspondence with a predetermined operation, and a storing medium for storing item data indicative of said plurality of items, and making a user select an arbitrary item from a plurality of items, wherein said information selecting program makes said computer execute:

a selection item setting step for setting the predetermined number of the items out of said item data as a selection item which is assigned to a direction corresponding to a vertex of said guide and a direction corresponding to a part except for the vertex of said guide, a selecting step for selecting an item corresponding to said direction data from said direction input unit, and outputting said item when predetermined first operation data is input, and, an interchanging step for interchanging the item assigned to the direction corresponding to the vertex of said guide and the item assigned to the direction corresponding to a part except for said vertex with respect to said selection item when predetermined second operation data is input.

* * * * *